(12) United States Patent
Passot

(10) Patent No.: US 12,053,892 B2
(45) Date of Patent: Aug. 6, 2024

(54) SYSTEMS, APPARATUSES AND METHODS FOR REMOVING FALSE POSITIVES FROM SENSOR DETECTION

(71) Applicant: Brain Corporation, San Diego, CA (US)

(72) Inventor: Jean-Baptiste Passot, San Diego, CA (US)

(73) Assignee: Brain Corporation, San Diego, CA (US)

( * ) Notice: Subject to any disclaimer, the term of this patent is extended or adjusted under 35 U.S.C. 154(b) by 601 days.

(21) Appl. No.: 17/226,471

(22) Filed: Apr. 9, 2021

(65) Prior Publication Data

US 2021/0220996 A1 Jul. 22, 2021

Related U.S. Application Data

(63) Continuation of application No. PCT/US2019/045867, filed on Aug. 9, 2019.

(60) Provisional application No. 62/717,145, filed on Aug. 10, 2018.

(51) Int. Cl.
*G01S 7/487* (2006.01)
*B25J 9/16* (2006.01)
*G05D 1/00* (2024.01)

(52) U.S. Cl.
CPC ........... *B25J 9/1676* (2013.01); *B25J 9/1664* (2013.01); *G01S 7/4876* (2013.01); *G05D 1/0238* (2013.01); *G05D 1/0231* (2013.01)

(58) Field of Classification Search
CPC ...... B25J 9/1676; B25J 9/1664; B25J 9/1697; G01S 7/4876; G01S 2013/9323; G01S 2013/9324; G01S 17/931; G01S 13/931; G05D 1/0238; G05D 1/0231; G05D 1/0214
USPC ........................................................ 702/104
See application file for complete search history.

(56) References Cited

U.S. PATENT DOCUMENTS

| | | | |
|---|---|---|---|
| 9,223,451 B1 * | 12/2015 | Raffle | G06F 3/011 |
| 2010/0202657 A1 * | 8/2010 | Salgian | G06V 40/103 |
| | | | 382/199 |
| 2012/0143808 A1 | 6/2012 | Karins et al. | |
| 2013/0312094 A1 * | 11/2013 | Zecheru | H04L 63/1433 |
| | | | 726/25 |
| 2014/0152975 A1 | 6/2014 | Ko | |
| 2015/0307023 A1 | 10/2015 | Rayes et al. | |
| 2016/0004923 A1 * | 1/2016 | Piekniewski | G06V 20/00 |
| | | | 348/302 |
| 2016/0086052 A1 * | 3/2016 | Piekniewski | G06T 7/292 |
| | | | 382/103 |
| 2017/0225336 A1 | 8/2017 | Deyle et al. | |

(Continued)

OTHER PUBLICATIONS

International Search Report and Written Opinion dated Nov. 8, 2019 for PCT/US19/45867.

*Primary Examiner* — Michael P Nghiem
(74) *Attorney, Agent, or Firm* — Reed Smith LLP; Sidharth Kapoor

(57) ABSTRACT

Systems and methods for removing false positives from sensor detection for robotic apparatuses traveling a route, wherein the robot may use a material filter, digital filter, or a combination of digital and material filters of increasing strength to remove a false positive from sensor detection. After removing the false positive, signals to one or more motors coupled to the robot may configure the robotic to travel past the false positive along the route.

18 Claims, 14 Drawing Sheets

(56) References Cited

U.S. PATENT DOCUMENTS

2017/0277197 A1    9/2017  Liao et al.
2017/0329347 A1*  11/2017  Passot .................. G05D 1/0246
2020/0117799 A1*  4/2020  Rambo .................. G06F 21/56

* cited by examiner

| Position along route | 1 | 2 | 3 | 4 | 5 | 6 | 7 | ... | N |
|---|---|---|---|---|---|---|---|---|---|
| Digital Filter | $H_1(\omega)$ | $H_2(\omega)$ | $H_3(\omega)$ | $H_4(\omega)$ | $H_5(\omega)$ | $H_6(\omega)$ | $H_7(\omega)$ | ... | $H_N(\omega)$ |
| Material Filter | 516-1 | 516-3 | 516-3 | 516-7 | 516-2 | 516-1 | 516-3 | ... | 516-N |

FIG. 8

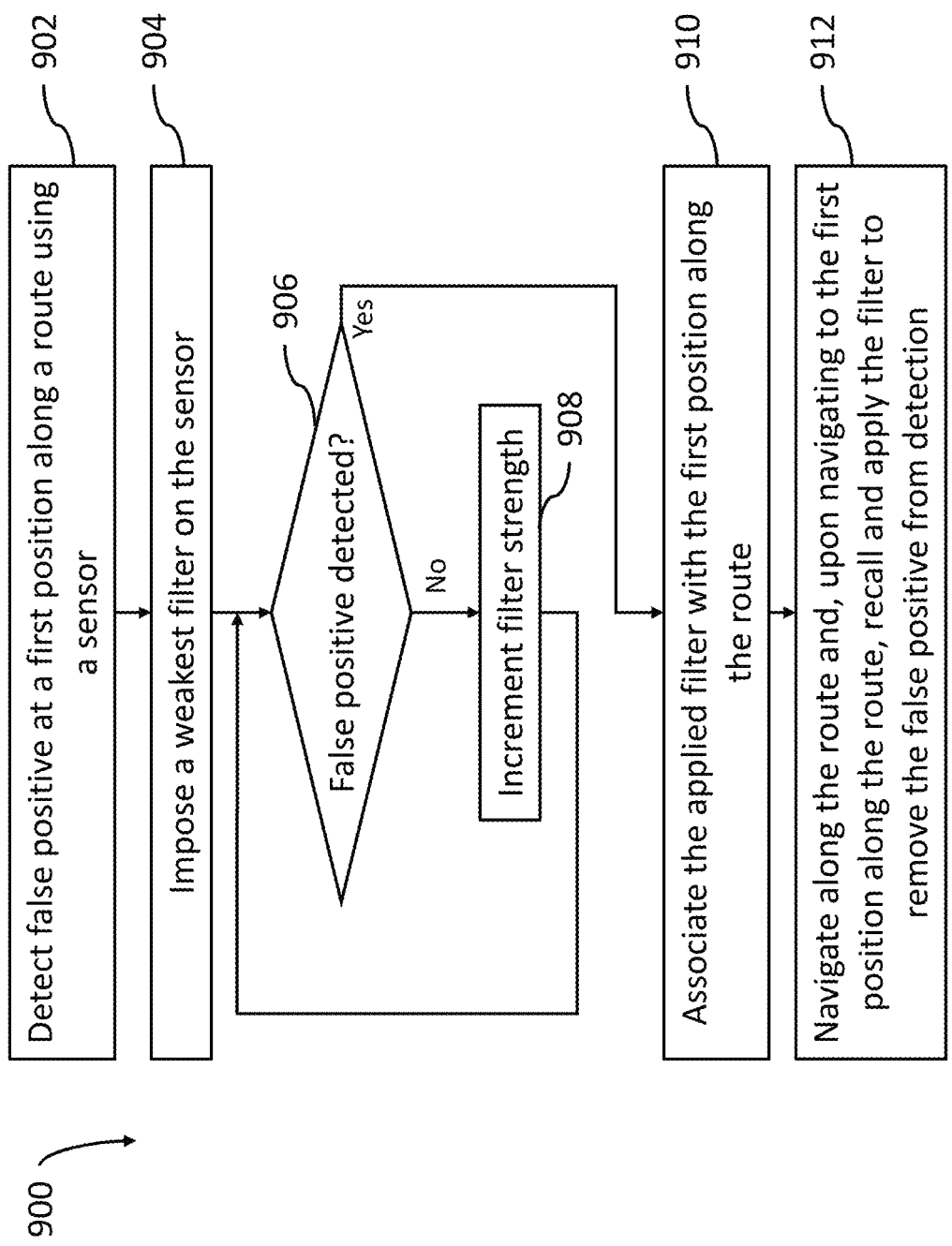

SYSTEMS, APPARATUSES AND METHODS FOR REMOVING FALSE POSITIVES FROM SENSOR DETECTION

PRIORITY

This application is a continuation of International Patent Application No. PCT/US19/45867 filed Aug. 9, 2019 and claims the benefit of U.S. Provisional Patent Application Ser. No. 62/717,145 filed on Aug. 10, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for robotic removing false positives from sensor detection.

Background

Currently, robots may comprise a plurality of sensors, such as light detection and ranging (LIDAR), depth cameras, and/or color imaging cameras, which are used for object detection as the robots navigate autonomously within their environment. These sensors in some instances may generate false positives such as, for example, detecting an object that does not exist because of light reflections, thermal noise, and/or other natural phenomena that may generate a detection signal in a sensor.

In some cases, a robot, upon detecting an object is blocking its route, will attempt to navigate the obstacle or simply think it is stuck and shut down. Detection of false positives may be costly and inefficient for a robot operating autonomously as an operator may be required to correct the robot. Accordingly, there is a need in the art for improved systems and methods for detecting and filtering false positives from detection by a sensor on a robot.

SUMMARY

The foregoing needs are satisfied by the present disclosure, which provides for, inter alia, systems and methods for robotics for removing false positives from detection by a sensor. The present disclosure is directed towards a practical application of systems and methods for removal of false positives detected by sensors of robots to enhance autonomy of robots.

Exemplary embodiments described herein have innovative features, no single one of which is indispensable or solely responsible for their desirable attributes. Without limiting the scope of the claims, some of the advantageous features will now be summarized.

In an exemplary embodiment, a robotic system is disclosed. In one or more exemplary embodiments, the robotic system may comprise at least one sensor configured to detect obstacles; a mapping unit configured to generate a computer-readable map of the environment; a navigation unit configured to activate the robot's one or more actuators to move the robot; a set of filters of increasing strength, used for filtering (i.e., removing) false positives; a user interface configured to display and receive information; and a processor configured to: detect a false positive at a location along a route and apply a filter at the location on the route to remove the false positive from the sensor data.

According to at least one non-limiting exemplary embodiment, the processor is further configured to learn a route from an operator moving (e.g., driving, pushing, etc.) or leading the robot along a route wherein the robot, using at least one sensor, may map the locations of obstacles along the route. Additionally, locations of false positives may be determined by the robot, operating under the control of an operator, being moved through a detected obstacle and determining the object detected is a false positive.

According to at least one non-limiting exemplary embodiment, a robotic system is disclosed. The robotic system may comprise a non-transitory computer readable memory comprising a plurality of instructions stored thereon and a processor configured to execute the computer readable instructions to configure the processor to: detect, using a sensor coupled to the robotic system, a false positive at a first location along a route; apply filter configurations of increasing strength to the sensor until the false positive is no longer detected by the sensor using a first filter configuration; and transmit signals to one or more motors coupled to the robotic system to configure the robotic system to travel past the false positive along the route. The filter configurations may comprise digital filter configurations, material filter configurations, or a combination thereof. In some instances, applications of the filter configurations are performed using simulated measurements of the false positive, the simulated measurements being based on measured data from one or more sensor units at the first location. In other instances, the robotic system may return to the first location at a later time from when the false positive was first detected and apply the filters of increasing strength to the sensor to remove the false positive from detection.

According to at least one non-limiting exemplary embodiment, the processor may be further configured to detect the false positive based on user input, the user input comprising at least one of the user effectuating movement of the robotic system through the detected false positive without detection of a collision, or the user providing input to a user interface of the robotic system indicating a detected object comprises a false positive (i.e., indicating that the object detected does not physically exist). According to at least one non-limiting exemplary embodiment, the processor may be further configured to detect the false positive based on the false positive being detected at the first location and not being detected in a continuous manner as the robotic system moves to a second location further along the route than the first location. In some instances, detection of the false positive may occur during training of the robot under user control (e.g., the user driving, leading, pushing, etc. the robot).

According to at least one non-limiting exemplary embodiment, the processor may be further configured to dynamically adjust parameters of the first filter configuration based on movements of the robotic system and dynamic lighting parameters observed using, at least in part, the sensor. Dynamic adjustment of the filter may comprise, for example without limitation, adjusting a position of the filter configuration, adjusting a strength of the filter configuration, or changing the first filter configuration to a second filter configuration based on the movements of the robotic system.

According to at least one non-limiting exemplary embodiment, the processor may be further configured to associate the first location along the route with the first filter configuration configured to remove the false positive from sensor detection at the first location and, upon navigation of the robotic system at the first location (e.g., at a later time), apply the first filter configuration to the sensor.

In an exemplary embodiment, a method for a robotic system to remove false positives along a route is disclosed. According to at least one non-limiting exemplary embodiment, the robotic system may comprise a set of filters of increasing strength to be applied to at least one sensor on the robotic system at corresponding locations along a route where a false positive is detected. The robotic system, upon reaching a known location along a route where the false positive is detected, will apply the filters of increasing strength until the robotic device no longer detects the false positive.

According to at least one non-limiting exemplary embodiment, the filters the robotic system can apply to at least one sensor may be a digital filter, such as a transformation matrix, band pass filter, cropping of a portion of an image, etc. The digital filters may be used to filter or manipulate data from at least one sensor in order to remove the false positive from the sensor data. According to at least one non-limiting exemplary embodiment, the filters the robotic system may apply to at least one sensor may comprise material filters, such as optical bandpass filters, semi-transparent materials, and/or materials which block light from reaching portions of a field of view of the sensor (i.e., blackout material filters). According to at least one non-limiting exemplary embodiment, the filters the robotic system may apply to the at least one sensor may comprise a combination of digital and material filters.

According to at least one non-limiting exemplary embodiment, the processor is further configured to remove the filter applied to at least one sensor once the robotic device has moved past the false positive.

In an exemplary embodiment, a non-transitory computer readable storage apparatus, comprising a plurality of instructions stored thereon, is disclosed. The non-transitory computer readable storage apparatus contains instructions that, when executed by a processor, cause the processor to receive or learn a map of an environment of the robotic device comprising the locations of objects and false positives; navigate a learned or given route within the environment; upon reaching a false positive, apply filters of increasing strength until the false positive is no longer detected; and store the filter used to remove the false positive for future navigation of the route.

According to at least one non-limiting embodiment, the non-transitory computer readable storage apparatus contains instructions that, when executed by a processor, cause the robot to virtually revisit locations along a route, wherein the robot replays the route from memory, a false positive is detected, and apply the appropriate filter to remove the false positive. According to another non-limiting exemplary embodiment, the non-transitory computer readable storage apparatus contains instructions that, when executed by the processor, cause the robot to maneuver farther away from objects to minimize the chance of detecting a false positive (e.g., from a reflection off a surface).

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 8 illustrates a data table comprising positions along a route and corresponding filter configurations used to remove false positives from detection by a sensor according to an exemplary embodiment.

FIG. 9 is a process flow diagram illustrating a method for filtering a false positive from sensor detection using a digital filter or a material filter, according to an exemplary embodiment.

Figure 1A:
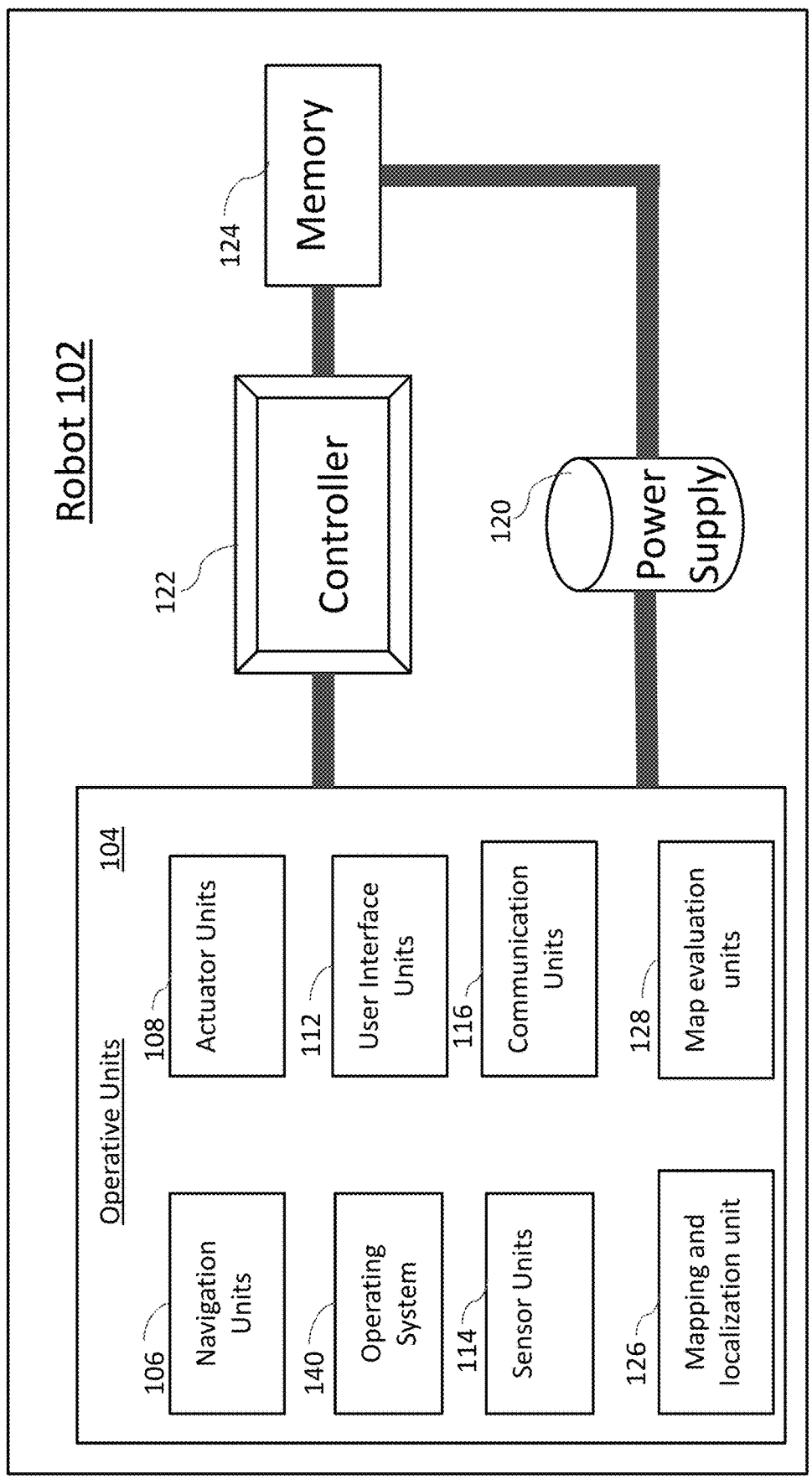
FIG. 1A is a functional block diagram of a robot in accordance with some implementations of this disclosure.

All Figures disclosed herein are © Copyright 2019 Brain Corporation. All rights reserved.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

As used herein, a robot can include mechanical and/or virtual entities configured to carry out a complex series of actions automatically. In some cases, robots can be machines that are guided and/or instructed by computer programs and/or electronic circuitry. In some cases, robots can include electro-mechanical components that are configured for navigation, where the robot can move from one location to another. Such robots can include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots can also include any autonomous and/or semi-autonomous machine for transporting items, people, animals, cargo, freight, objects, luggage, and/or anything desirable from one location to another. In some cases, such robots used for transportation can include robotic mobile platforms as the robots are mobile systems that can navigate and/or move autonomously and/or semi-autonomously. These robotic mobile platforms can include autonomous and/or semi-autonomous wheelchairs, bikes, row boats, scooters, forklifts, trams, trains, carts, vehicles, tugs, and/or any machine used for transportation.

Certain examples are described herein with reference to certain robotic devices. Such examples are used for illustration only, and the principles described herein may be readily applied to robots generally.

Detailed descriptions of the various implementations and variants of the system and methods of the disclosure are now provided. While many examples discussed herein may refer to robotic floor cleaners, it will be appreciated that the described systems and methods contained herein are applicable to any kind of robot. Myriad other example implementations or uses for the technology described herein would be readily envisaged by those having ordinary skill in the art, given the contents of the present disclosure.

Advantageously, the systems and methods of this disclosure at least: (i) allow robots to safely operate in environments; (ii) reduce the number of false positives detected by a robot's sensors; (iii) enhance a process flow for robots to work in their corresponding environment; and (iv) improve the efficiency, cost-effectiveness, and/or time of operation of robots. Other advantages are readily discernible by one having ordinary skill in the art given the contents of the present disclosure.

As used herein, a filter may further comprise a material filter, digital filter, or a combination of both filter types. A material filter may comprise any material capable of partially blocking light and/or regions of light reaching a sensor (e.g., tinted lenses, blackout filters, etc.). A material filter may be further configured to block specific frequencies or bandwidths of light, block regions where the light is received by a sensor, and/or reduce the intensity of light received by the sensor. A digital filter may comprise any digital filtering operation (e.g., band pass filter, cropping a portion of an image, filtering measurements within a portion of a field of view of a sensor, etc.) applied to the data from a sensor.

As used herein, the strength of a filter may correspond to the amount of information (e.g., light information, digital data, etc.) the filter removes. For example, a digital band-pass filter with an exemplary passband of 5 Hz is stronger than a band-pass filter with an exemplary passband of 10 Hz. Similarly, a material filter which blocks 50% of all light passing through the filter is stronger than a material filter which blocks 25% of all light passing through the filter.

As used herein, dynamic adjustment of a filter may comprise changing parameters (e.g., strength, position, etc.) of the filter based on dynamic environmental parameters (e.g., changes in lighting effects, surrounding objects, etc.) and/or movements of a robot. For example, at noon a robot may utilize a material filter to remove a false positive from detection whereas during the afternoon or evening, when the lighting is lower, the robot may utilize a weaker filter to remove the false positive. In other words, the type of filter being used by the robot to remove the false positive may be dependent on the day, among other parameters which may affect sensor measurements. Additionally, a robot may reposition a material filter or manipulate a transfer function of a digital filter as the relative position of a detected false positive changes due to movements of the robot through an environment. As a second example, a robot may utilize a filter to remove a false positive from detection, wherein the filter may be adjusted (e.g., repositioned) based on relative motion of the false positive as viewed from a reference frame of the moving robot.

Figure 2:
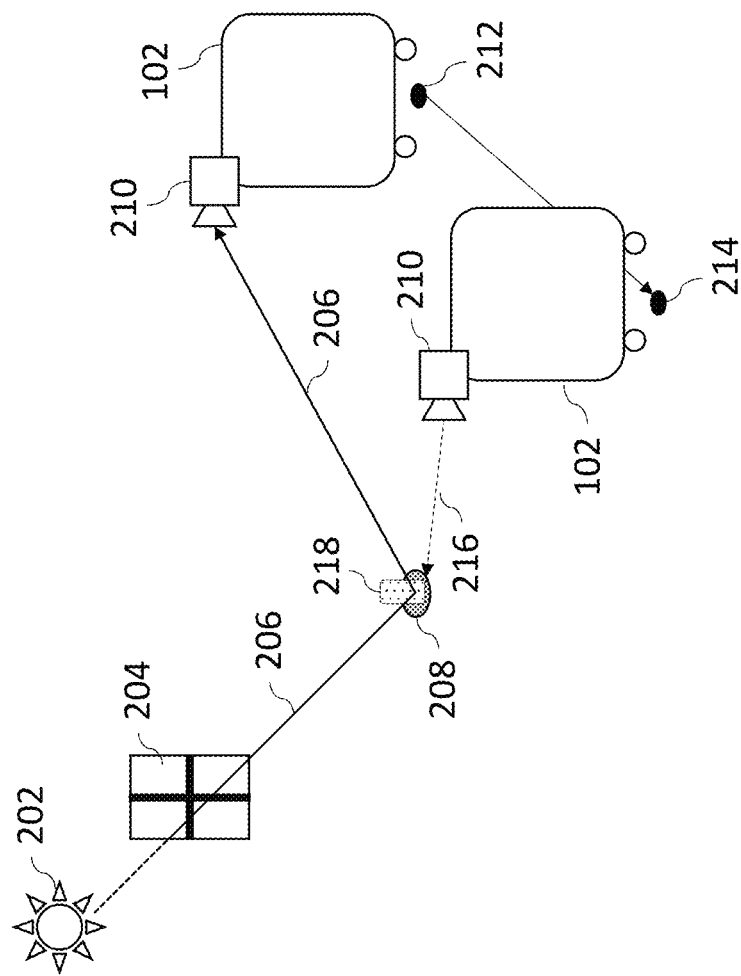
FIG. 2 illustrates a robot detecting an object due to excess light reaching a sensor and a method for determining the object is a false positive caused by the excess light, according to an exemplary embodiment.

As used herein, detection of an object (e.g., a false positive or real object) in a continuous manner by a sensor comprises detection the object in a way such that the object and parameters thereof is/are continuously detected as a robot moves when accounting for relative motions of the robot and object. For example, a robot may detect a box, or other real object (e.g., a human), while positioned at a first location, wherein movement of the robot from the first location may still yield detection of the box in a continuous way (e.g., the box does not change size, shape, etc. as the robot moves when accounting for relative motion of the robot). As another example, light reflecting off of a reflective surface may cause detection of an object (i.e., a false positive) and, as the robot moves, the light reflections as perceived by a sensor may change size, shape, or may disappear/reappear as the robot moves substantially differently from real objects. Typically, detection of an object (e.g., a false positive) not in a continuous manner refers to detection of a false positive generated due to excess light reaching a sensor, for example, due to sunlight reflecting off of reflective surfaces and/or floors as illustrated in FIG. 2 below.

As used herein, a virtual robot may refer to simulations of a robot on a computer readable map or in a simulation environment. Virtual robots may comprise, for example, representations of a robot at locations separate from a current location of the robot (e.g., to simulate potential motions of the robot). In some embodiments, a robot may collect and recall measurements from any or all of its sensor units at a location and utilize a virtual robot to simulate itself at the location while the robot is at a separate location (e.g., to determine a filter to be utilized to remove a false positive from sensor detection). That is, virtual robots may simulate decisions (e.g., motions to execute, filters to apply to a sensor, etc.) of the robot such that the robot may determine its decisions ahead of time and/or while the robot is at a separate location.

As used herein, a footprint of a robot may comprise the physical space that the robot occupies at particular locations on a computer readable map of an environment of the robot. Additionally, a footprint of a robot or virtual robot overlapping an obstacle may be indicative of the robot or virtual robot colliding with the obstacle as the space that the robot or virtual robot occupies coincides with an obstacle.

As used herein, a false positive may comprise any object identified by a sensor that does not exist. For example, a sensor might perceive a reflection off a surface as an object wherein the perceived object is a false positive.

As used herein, an object or obstacle may comprise any objects, barriers, walls, and/or items within an environment of a robot wherein the robot must navigate around these obstacles or objects without collision or getting stuck.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software may include any sequence machine cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

FIG. 1A is a functional block diagram of a robot 102 in accordance with some principles of this disclosure. As illustrated in FIG. 1A, robot 102 may include controller 122, memory 124, user interface unit 112, mapping and localization unit 126, sensor units 114, actuator unit 108, and communications unit 116, as well as other components and subcomponents (e.g., some of which may not be illustrated).

Although a specific implementation is illustrated in FIG. 1A, it is appreciated that the architecture may be varied in certain implementations as would be readily apparent to one of ordinary skill given the contents of the present disclosure. As used herein, robot 102 may be representative at least in part of any robot described in this disclosure.

Controller 122 may control the various operations performed by robot 102. Controller 122 may include and/or comprise one or more processors (e.g., microprocessors) and other peripherals. As used herein, processor, microprocessor, and/or digital processor may include any type of digital processing device such as, without limitation, digital signal processors ("DSPs"), reduced instruction set computers ("RISC"), complex instruction set computers ("CSIC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 122 may be operatively and/or communicatively coupled to memory 124. Memory 124 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 124 may provide instructions and data to controller 122. For example, memory 124 may be a non-transitory, computer-readable storage apparatus and/or medium having a plurality of instructions stored thereon, the instructions being executable by a processing apparatus (e.g., controller 122) to operate robot 102. In some cases, the instructions may be configured to, when executed by the processing apparatus, cause the processing apparatus to perform the various methods, features, and/or functionality described in this disclosure. Accordingly, controller 122 may perform logical and/or arithmetic operations based on program instructions stored within memory 124. In some cases, the instructions and/or data of memory 124 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 122 of robot 102 utilizing communication units 116 wherein the external processor may receive data from robot 102, process the data, and transmit computer-readable instructions back to controller 122. In at least one non-limiting exemplary embodiment, the processor may be on a remote server (not shown).

In some exemplary embodiments, memory 124, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensors unit 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 124, and/or local or remote storage). In exemplary embodiments, at least a portion of the library may be stored on a network (e.g., cloud, server, distributed network, etc.) and/or may not be stored completely within memory 114. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 122, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 122) may serve as the various controllers and/or processors described. In other embodiments different controllers and/or processors may be used, such as controllers and/or processors used particularly for one or more operative units 104. Controller 122 may send and/or receive signals, such as power signals, status signals, data signals, electrical signals, and/or any other desirable signals, including discrete and analog signals to operative units 104. Controller 122 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative unit 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may further comprise a mapping and localization unit 126 that may receive sensor data from sensors units 114 to localize robot 102 in a map. In exemplary embodiments, mapping and localization units may include localization systems and methods that allow robot 102 to localize itself in the coordinates of a map and/or relative to a location (e.g., an initialization location, end location, beacon, reference point, etc.). Mapping and localization units may also process measurements taken by robot 102, such as by generating a graph and/or map. In some embodiments, mapping and localization unit 126 may not be a separate unit, but rather a portion of sensors unit 114 and/or controller 122.

In some embodiments, navigation units 106 may further comprise or be coupled to a map evaluation unit 128 that may analyze and evaluate a map or route to detect errors (e.g., map errors, map resolution, discontinuous routes, etc.), and/or the usability of a map or route. In exemplary embodiments, navigation units 106 determine a map to be unusable and/or contain errors causing robot 102 to prompt a user to re-demonstrate a route, or otherwise re-map the environment. In some embodiments, the map evaluation unit 128 may further map locations of detected false positives on computer readable maps, as discussed below.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

In exemplary embodiments, robot 102 may map and learn routes through a learning process. For example, an operator may teach robot 102 where to travel in an environment by driving, pushing, pulling, leading, etc. robot 102 along a route in an environment. Through a combination of sensor data from sensor units 114, robot 102 may determine robot 102's relative poses and the poses of items in the environment. In this way, robot 102 may determine where it is in an environment and where it has travelled. Robot 102 may later recall where it travelled and travel in a substantially similar way (though it may avoid certain obstacles in subsequent travels). In some embodiments, robots may share such experiences with each other wirelessly, utilizing communication units 116.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; and rotate cameras and sensors.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

Mapping and localization unit 126 may receive sensor data from sensor units 114 to localize robot 102 and detected objects (e.g., using sensor units 114) onto a computer readable map. According to exemplary embodiments, mapping and localization unit 126 may include localization systems and methods that allow robot 102 to localize itself in the coordinates of a map and/or relative to a location (e.g., an initialization location, end location, beacon, reference point, etc.). Mapping and localization unit 126 may also process measurements taken by robot 102, such as by generating a graph and/or map. According to exemplary embodiments, mapping and localization unit 126 may not be a separate unit, but rather a portion of sensor units 114 and/or controller 122.

According to exemplary embodiments, robot 102 may map and learn routes through a learning process. For example, an operator may teach robot 102 where to travel in an environment by driving robot 102 along a route in an environment. Through a combination of sensor data from sensor units 114, robot 102 may determine robot 102's relative poses and the poses of items in the environment. In this way, robot 102 may determine where it is in an environment and where it has travelled. Robot 102 may later recall where it travelled and travel in a substantially similar way (though it may avoid certain obstacles in subsequent travels). Robots may share such experiences with each other, such as through a network.

According to exemplary embodiments, user interface unit 112 may be configured to enable a user to interact with robot 102. For example, user interface unit 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCM-CIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 112 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface unit 112 may be positioned on the body of robot 102. According to exemplary embodiments, user interface unit 112 may be positioned away from the body of robot 102, but may be communicatively coupled to robot 102 (e.g., via communication units including transmitters, receivers, and/or transceivers) directly or indirectly (e.g., through a network, server, and/or a cloud). According to exemplary embodiments, user interface unit 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

By way of illustration, robot 102 may have a projector, lights, and/or other projection systems. Robot 102 may project an image on the floor to let people know the direction of movements and/or the next action. For example, robot 102 may project an image of a path onto the floor to let people know where it will be traveling. Other images projected on the floor may indicate to people where robot 102 plans to stop, when it plans to start moving, where it moves, and/or useful information to make people around the robot feel more comfortable and safer. Such projections may utilize substantially similar systems and methods as U.S. Patent Publication No. 2016/0375592, now U.S. Pat. No. 9,840,003, entitled "APPARATUS AND METHODS FOR SAFE NAVIGATION OF ROBOTIC DEVICES," which is hereby incorporated herein by reference in its entirety.

According to exemplary embodiments, communications unit 116 may include one or more receivers, transmitters, and/or transceivers. Communications unit 116 may be configured to send/receive a transmission protocol, such as BLUETOOTH©, ZIGBEE©, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/ 802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB LX, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

One or more of the units described with respect to FIG. 1A (including memory 124, controller 122, sensor units 114, user interface unit 112, actuator unit 108, communications unit 116, mapping and localization unit 126, and/or other units) may be integrated onto robot 102, such as in an integrated system. However, according to exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a controller (e.g., controller 122) performing a task or function includes the controller executing instructions from a non-transitory computer readable memory unit (e.g., memory 124) communicatively coupled to the controller. Similarly, a robot 102 performing a task includes a controller 122 of the robot 102 executing instructions from a non-transitory computer readable memory unit 124 and sending signals to a plurality of operative units 104 effectuating their control. Additionally, it is appreciated by one of ordinary skill in the art that a controller or processor and memory units may be external to a robot 102 and communicatively coupled via wired or wireless communication channels, further illustrated in FIG. 1B.

Figure 1B:
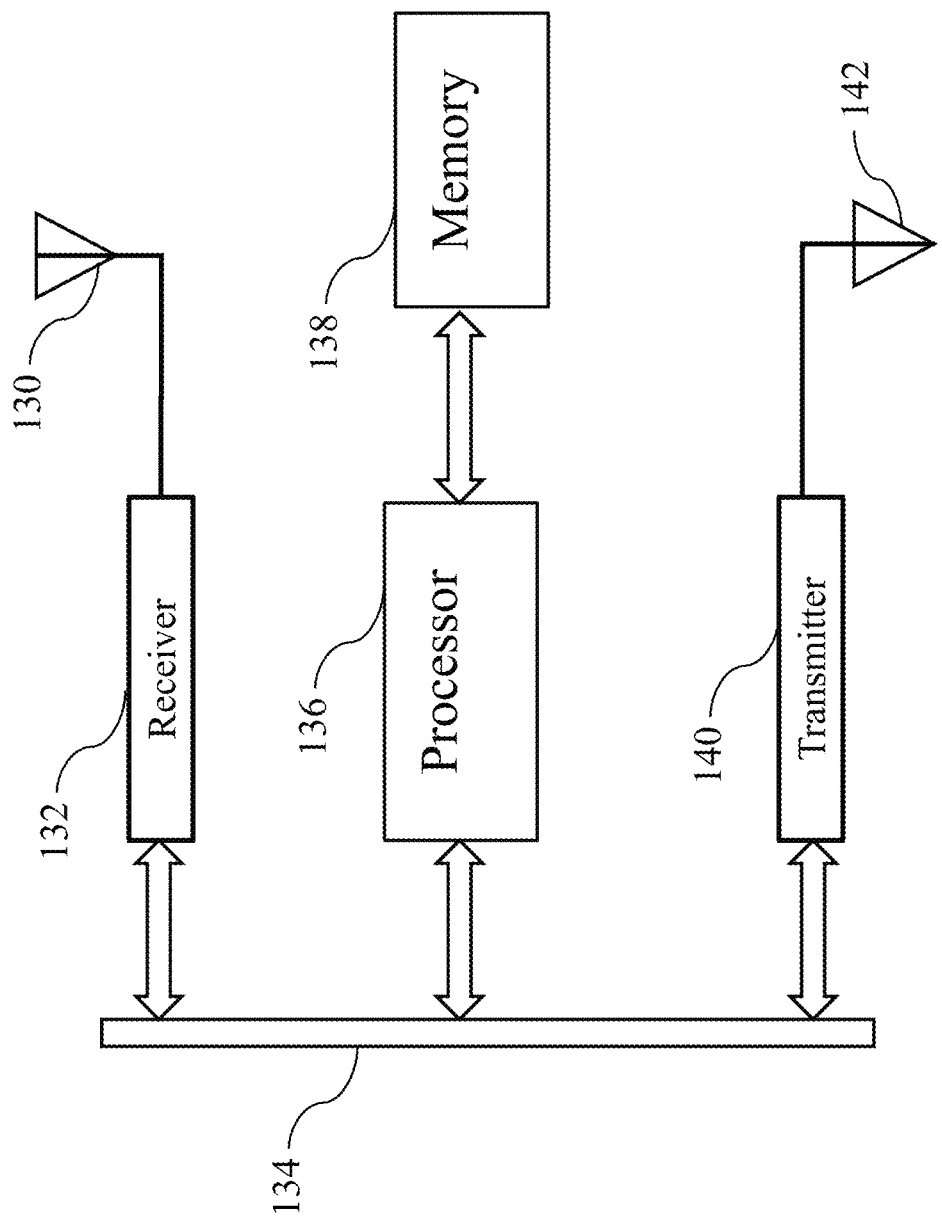
FIG. 1B is a functional block diagram of a controller or processor used in some embodiments of this disclosure.

Next referring to FIG. 1B, the architecture of the specialized controller 122 used in the system shown in FIG. 1A is illustrated according to an exemplary embodiment. As illustrated in FIG. 1B, the specialized computer includes a data bus 134, a receiver 132, a transmitter 140, at least one processor 136, and a memory 138. The receiver 132, the processor 136 and the transmitter 140 all communicate with each other via the data bus 134. The processor 136 is a specialized processor configured to execute specialized algorithms. The processor 136 is configured to access the memory 134, which stores computer code or instructions in order for the processor 136 to execute the specialized algorithms. As illustrated in FIG. 1i, memory 138 may comprise some, none, different, or all of the features of memory 124 previously illustrated in FIG. 1A above. The algorithms executed by the processor 136 are discussed in further detail below. The receiver 132 as shown in FIG. 1B is configured to receive input signals 130. The input signals 130 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 122. The receiver 132 communicates these received signals to the processor 136 via the data bus 134. As one skilled in the art would appreciate, the data bus 134 is the means of communication between the different components-receiver, processor, and transmitter—in the specialized controller 122. The processor 136 executes the algorithms, as discussed below, by accessing specialized computer-readable instructions from the memory 138. Further detailed description as to the processor 136 executing the specialized algorithms in receiving, processing and transmitting of these signals is discussed above with respect to FIG. 1A. The memory 138 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 136 may communicate output signals to transmitter 140 via data bus 134 as illustrated. The transmitter 140 may be configured to further communicate the output signals to a plurality of operative units 104 illustrated by signal output 142.

One of ordinary skill in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

FIG. 2 illustrates sunlight 206 causing a detection of an object 218 and a method for determining the object 218 is a false positive, according to an exemplary embodiment. Sun 202 may be illustrative of the Sun or any light source within an environment of robot 102. Similarly, sunlight 206 may be illustrative of any light emitted from a source (e.g., fluorescent lights, etc.), and is not intended to be limiting to light emitted by the Sun. Sunlight 206 may pass through a window 204 and be reflected off a floor at location 208 to be received by sensor 210 of robot 102, the robot 102 being at a first location 212. Sensor 210 may comprise any exteroceptive sensor unit 114 illustrated in FIG. 1A above. Sunlight 206 may cause a controller 122 of robot 102 to detect an object 218 at location 208 due to sunlight 206 causing excessive noise within data from sensor 210. The object 218 at location 208 may therefore comprise of a false positive, or a detected object which does not physically exist due to, in this example, excess noise within data from sensor 210.

False positive objects detected due to reflection of light (e.g., sunlight 206) off of reflective surfaces may be determined by the controller 122 to comprise false positives based on detection of the false positive in a manner which is not continuous as the robot 102 moves. For example, the robot 102 may navigate from a first location 212 to a second location 214 to capture a different perspective view of the false positive object 218. In doing so, the path traveled by sunlight 206 no longer reaches sensor 210 when robot 102 is at the second location 214, as illustrated by beam 216 (dotted line) from sensor 210 to the object 218 not crossing the path formed by sunlight 206 (e.g., due to window 204 and/or other objects blocking other paths of sunlight 206). Accordingly, the object 218 may no longer be detected by sensor 210 when robot 102 is at the second location 214, and may therefore be determined by the controller 122 to comprise a false positive due to excess light noise. If the false positive was in fact a real object at location 208, the sensor 210 may detect the real object at both the first and second locations 212, 214 in a continuous manner such that the size, shape, and/or presence of the real object remains constant as robot 102 moves, accounting for relative motions of the robot 102 and/or the real object. Stated differently, controller 122 of robot 102 may determine a detected object 218 at location 208 comprises a false positive based on data from sensor 210 detecting the object 218 while robot 102 is at a first location 212 but not detecting the object 218 in a continuous manner as the robot 102 moves to a second location 214, wherein the object 218 (i.e., false positive) is not detected at the second location 214. The first and second locations 212, 214 may comprise any two locations (e.g., along a route traveled by robot 102) where, if object 218 is a real object, the object 218 should be sensed by sensor 210, and are not intended to be limiting to the illustrated locations.

Using systems and methods disclosed below, robot 102, upon returning to location 212 (e.g., at a later time), may apply filter configurations of increasing strength to remove detection of the false positive at location 208. Upon removing the false positive from detection using one of a plurality of filter configurations, the filter configuration used may be stored in memory 124 and recalled for later use in removing the false positive from detection. It is appreciated by one skilled in the art that a false positive may be detected by a sensor unit 114 for a plurality of reasons (e.g., thermal noise, reflections of beams emitted by a LiDAR or depth camera, etc.), wherein the false positive being detected due to light reflections is not intended to be limiting.

Figure 3A:
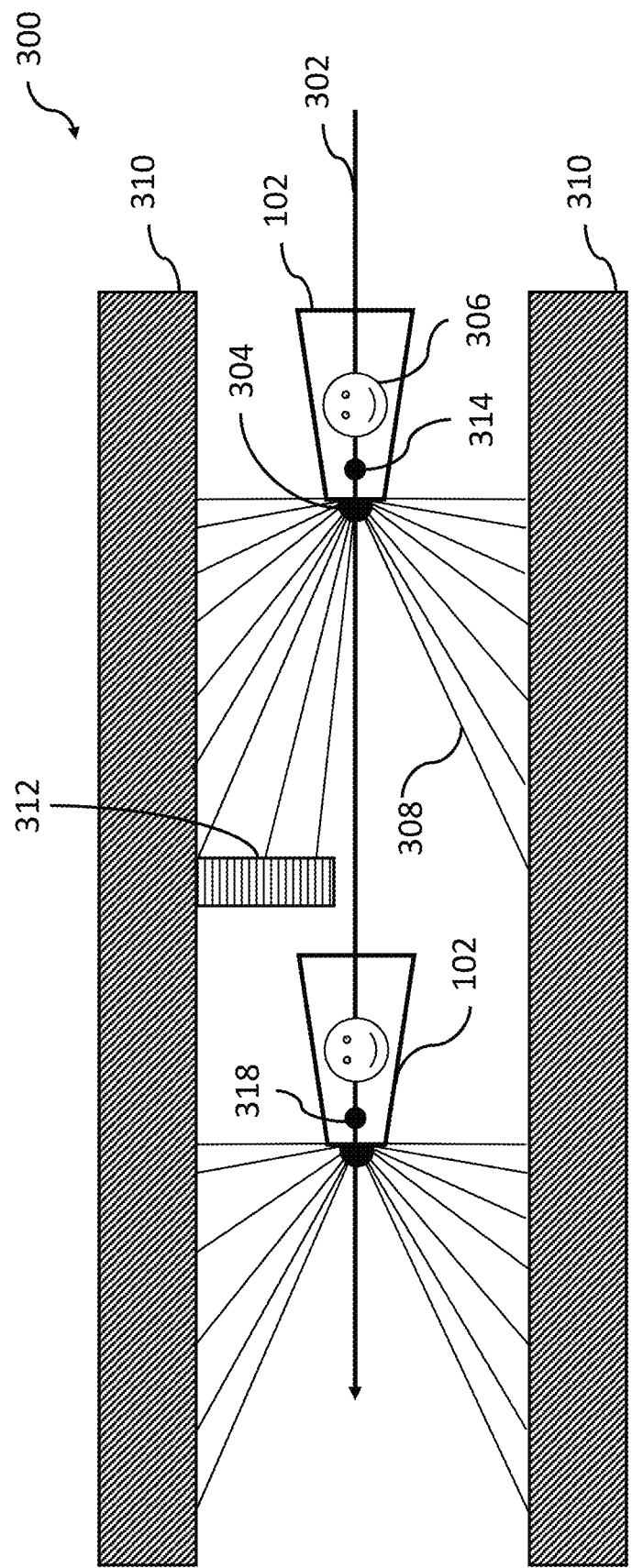
FIGS. 3A-C is top view illustrative embodiments of a robot detecting and filtering a false positive along a route, according to an exemplary embodiment.
Figure 3B:
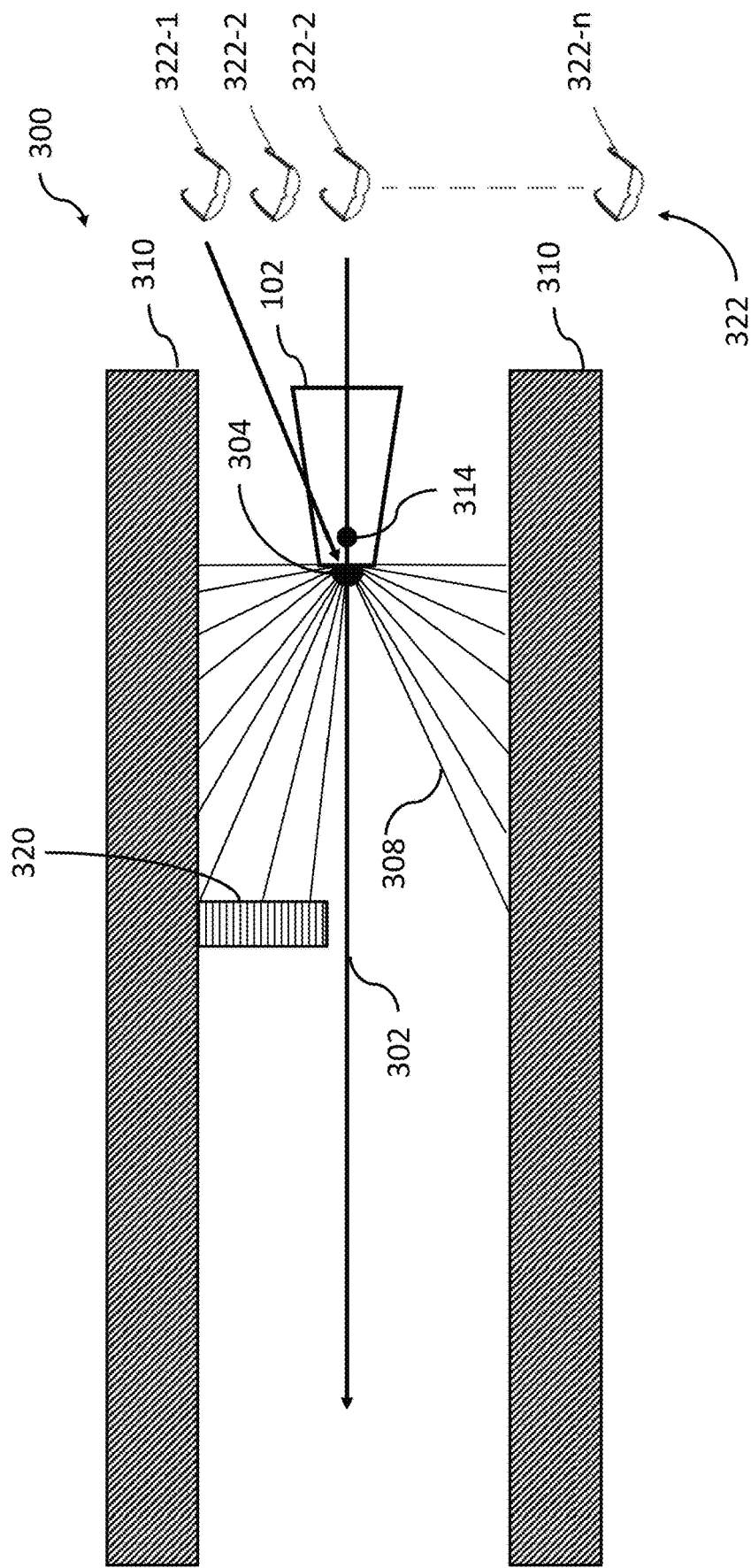
Figure 3C:
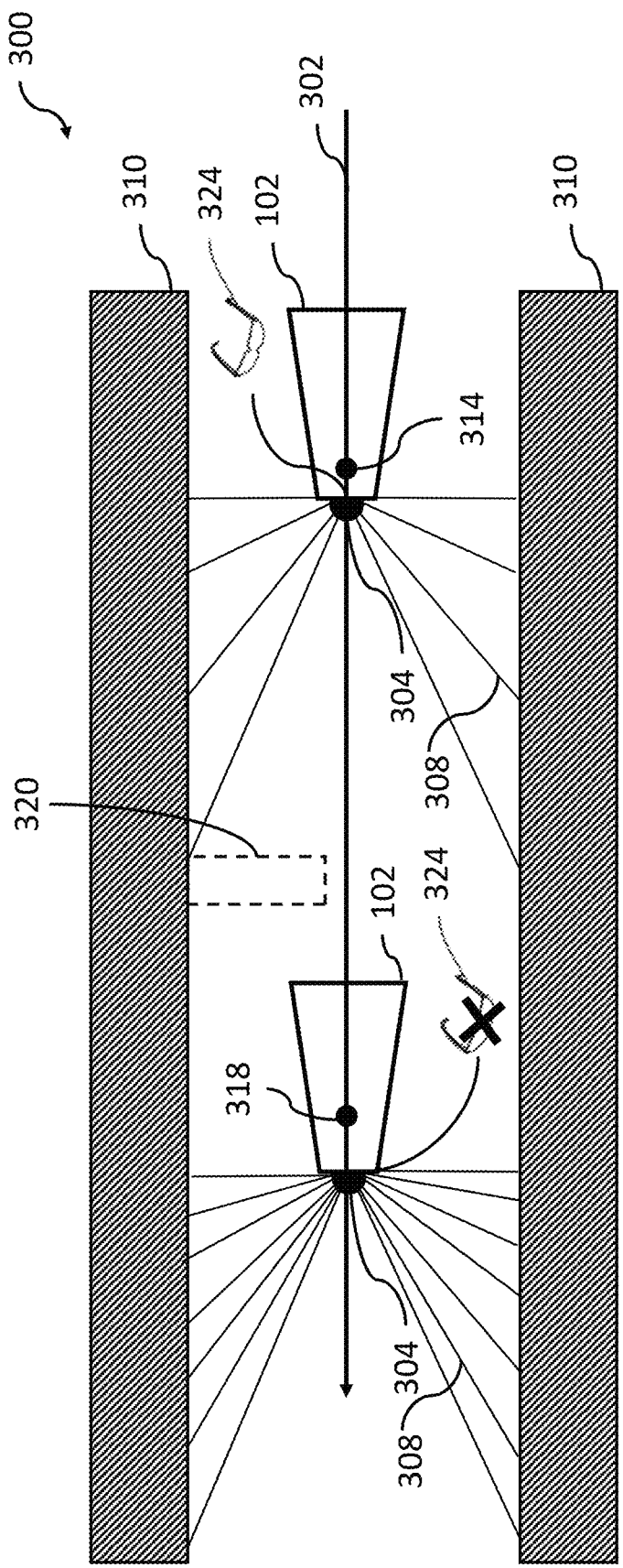

FIG. 3A is a top view of robot 102, operated by an operator 306 in a learning and/or manual mode, being navigated along route 302 within environment 300 comprising known barriers 310 according to an exemplary embodiment. The navigation being effectuated by the user 306 (e.g., the user 306 driving, pushing, leading, etc. the robot 102). At a first position 314, robot 102, using sensor 304, detects an object 312 along route 302, as illustrated by plurality of sensor vision lines 308 touching, coming in contact with, being received by (e.g., emitted from), or being reflected off barriers 310 and objects 312. Sensor vision lines 308 may be illustrative of, for example, beams of a LiDAR sensor, light rays emitted from a depth camera, or paths of light being received by an imaging camera and are intended to be visualizations of data (e.g., light data) collected by sensor 304. As illustrated in FIGS. 3A-C, sensor 304 may comprise some, none, or all of the functionalities of sensor units 114 illustrated in FIG. 1A such as, for example, sensor 304 being a depth camera, color image camera, LiDAR, or other exteroceptive sensor. Robot 102 detects that a collision will occur with object 312 if continued along route 302, however, operator 306 navigates robot 102 to a second position 318 past the detected object 312, wherein a footprint of robot 102 overlaps at least once with object 312 indicative of a collision. The overlap being detected on a computer readable map of the environment comprising, at least in part, of barriers 310 and objects 312 surrounding the robot 102 and the footprint of the robot 102 is representative of a position of and area occupied by the robot 102 on the compute readable map. Robot 102 may determine object 312 is a false positive based on operator 306 navigating robot 102 through object 312 without a collision being detected. Robot 102 may store location 314 (and 318, in some embodiments) as well as the parameters of object 312 (e.g., wavelength detected, size, location, and environmental parameters such as lighting, data from any or all sensor units 114, etc.) in memory 124, as illustrated in FIG. 1A. Stated another way, by having robot 102 move or navigate from first location 314 to second location 318, by the operator 306, while sensor 304 on robot 102 detects object 312, aids robot 102 to understand, comprehend and recognize that in fact object 312 was not actually present along its route 302 that it would collide or possibly collide with.

According to another non-limiting exemplary embodiment, robot 102 may determine object 312 is a false positive during navigation from point 314 to 318 (i.e., a first location to a second location) when object 312 is not detected in a continuous manner as robot 102 traverses from first point 314 to second point 318, as illustrated in FIG. 2 above. For example, in an exemplary case, false positive may be a reflection off a surface or a false-detection of a barrier that is not present. As robot 102 moves from point 314 to point 318, the reflection may not be continuously detected due to the sensor 304 sensing the object 312 (i.e., light reflections) from different perspectives, wherein the false positive object may change size, shape, or disappear/reappear as robot 102 moves. Additionally, barriers 310, comprising real objects, may be detected in a continuous manner as robot 102 moves due to the barriers 310 being continuously detected in a substantially similar way as the robot 102 moves, accounting for relative motion of robot 102 (e.g., size, shape, and/or presence of barriers 310 does not change as robot 102 moves). Therefore, robot 102 may determine object 312 is a false positive since the reflection (i.e., the object 312) may only be perceived from certain locations (e.g., first point 314) and an object that is not a false positive would be detected in a continuous manner as the robot 102 moves.

According to at least one non-limiting exemplary embodiment, barriers 310 may comprise known objects on a computer readable map, stored in memory 124, wherein the computer readable map may be either given by operator 306 or learned by robot 102 using mapping and localization units 126 and/or map evaluation units 128. According to at least one non-limiting exemplary embodiment, object 312 may be located directly on, near, or close to route 302 of robot 102. According to at least one non-limiting exemplary embodiment, robot 102 may prompt user 306 via a user interface, of user interface units 112 shown in FIG. 1A, to confirm that object 312 was not seen by operator 306 and may therefore be determined to be a false positive. In other words, robot 102 is able to perceive and differentiate object 312 from barriers 310 as operator 306 routes robot 102 from the first location or point 314 to a second location or point 318.

According to at least one non-limiting exemplary embodiment, as operator 306 teaches route 302 to robot 102, the robot 102 may display on a user interface unit 112 any and/or all localized barriers 310 and objects 312 on a map. The operator 306 may indicate on the user interface unit 112 any or all detected objects localized on the map which do not exist (e.g., object 312), wherein controller 122 of robot 102 may identify object 312 as false positives based on the indication.

FIG. 3B is a top view of robot 102 revisiting location 314 (e.g., during autonomous operation) within environment 300 where an object 312, illustrated in FIG. 3A above, was determined to comprise of a false positive 320 during manual operation by operator 306, according to an exemplary embodiment. In other words, in FIG. 3B robot 102 is operating in an automated mode, instead of a manual or learning mode, without input from operator 306. Robot 102 may navigate back to location 314 to determine a best filter from a plurality of filters 322 (322-1, 322-2 ... 322-n) of increasing strength to be applied to sensor 304 such that false positive 320 (i.e., object 312) is no longer detected by sensor 304 (as illustrated using sensor vision lines 308) as the robot 102 travels along route 302 and approaches the false positive 320. As illustrated in exemplary FIG. 3B, controller 122 parses the plurality of filters 322 (322-1, 322-2 ... 322-n) starting with the weakest filter 322-1 and moving sequentially through the plurality of filters 322, wherein each subsequent filter is stronger than the previous filter (e.g., blocks more light and/or data from sensor 304).

By being a strong filter, the filter may block more or additional information than a weaker filter. For example, a stronger filter may block information such as light and/or digital data. As illustrated in FIGS. 3B-C, the plurality of filters 322 are illustrated by "sunglasses," wherein the use of filters to block light from a sensor 304 of a robot 102 is analogous to a robot 102 wearing sunglasses to block excess light corresponding to a false positive detection reading. Controller 122 continues through the plurality of filters 322 by executing specialized algorithm until best filter 324, illustrated in FIG. 3C, is determined wherein best filter 324 may be the weakest filter of filters 322 which, when applied to sensor 304, removes false positive 320 from detection. Robot 102 may comprise any number of filters 322, wherein index "n" of filter 322-n is indicative of any positive integer number corresponding to the total number of filters on robot 102. Accordingly, robot 102 applies a weaker filter to the sensor first and then moves to applying a stronger filter to the sensor (e.g., in accordance with methods illustrated in FIGS. 4, 6, and 9 below).

According to at least one non-limiting exemplary embodiment, a plurality of filters 322 may comprise a set of material filters of increasing strength. The material filters may comprise materials to remove certain wavelengths of light, adjust brightness of light over a specified bandwidth, and/or block regions of light reaching sensor 304 (i.e., block portions of a field of view of the sensor 304). Additionally, as the material filter index increases (e.g., 322-1 to 322-2, etc.) the amount of light reaching sensor 304 decreases. This is analogous to an individual putting on sunglasses when experiencing sunrays in an outdoor environment, wherein each sequential pair of sunglasses is stronger (i.e., blocks more sunrays) than the previous pair. The material filter 322-1 may comprise, for example, a material configured to reduce the intensity of light reaching sensor 304 by 25%, material filter 322-2 may be configured to reduce the intensity of the light by 35%, and so on and so forth. These material filters may be positioned in front of the light-receiving aperture of sensor 304 by a filter actuator unit 510, further illustrated in FIG. 5, and dynamically adjusted based on the position of the false positive 320 relative to the sensor 304 as the robot 102 moves along route 302. For example, filter actuator unit 510 may position a material filter to remove false positive 320 at position 314, however, as robot 102 moves along route 302, the positioning of the material filter 322 may be dynamically adjusted to account for the change in relative position of the false positive 320 as perceived by sensor 304.

According to another non-limiting exemplary embodiment, a plurality of filters 322, as illustrated in FIG. 3B, may comprise a set of digital filters, wherein as the filter index increases (e.g., 322-1 to 322-2 etc.) the amount of digital data filtered increases. For example, if filters 322 are high-pass filters removing particular low-frequencies of light or image data from data arriving from sensor 304, the rising edge of filter 322-1 would be at a lower frequency than filter 322-2, and so forth. According to another non-limiting exemplary embodiment, filters 322 may comprise transformations or manipulations to data from sensor 304, wherein the transformations are generated to remove false positive 320 from the data of sensor 304, the transformations comprising transformations of the location, orientation, and/or other physical properties of false positive 320 detected by sensor 304. In some exemplary embodiments, digital filters 322 may be configured to crop a portion of an image if sensor 304 is an imaging camera. Additionally, the magnitude of the transformations (i.e., the amount of data removed or manipulated by a filter) applied increases as the index of filters 322 increase (e.g., 332-1 being a weaker filter than 332-2, and so forth). Additionally, controller 122 may make dynamic changes to the digital filter used to remove false positive 320 from detection to account for changes in relative positioning of robot 102 and false positive 320 as robot 102 navigates route 302. For example, the region of sensor data corresponding to detecting a false positive (e.g., a portion of an image) may change in time as robot 102 moves from a first position 314 to a second position 318 thereby requiring dynamic changes to the parameters (e.g., position of a cropped portion of the image) of the applied digital filter to account for this movement.

According to another non-limiting exemplary embodiment, filters 322 may comprise a combination of digital filtering operations, data transformations, and material filters, as further illustrated in later FIGS. 5, 6, and 7A-C.

According to at least one non-limiting exemplary embodiment, robot 102 as illustrated in FIG. 3B may be representative of a virtual robot, wherein robot 102, using controller 122 to recall parameters of false positive 320 from memory 124, may superimpose itself virtually (e.g., being at a separate location from first location or point 314) to determine the best filter of the plurality of filters 322 ahead of time, and prior to traveling the route 302. The parameters recalled corresponding to measurements taken by any or all sensor units 114 at the location 314 (e.g., a library of sensor data stored in memory 124 including images, LiDAR scans, IMU data, etc. collected at the location 314). Using the virtual robot, robot 102 may determine a best filter 324, illustrated in FIG. 3C, of the plurality of filters 322 to be used at first location or point 314 to remove false positive 320 using substantially similar methods to the above as would be appreciated by one of ordinary skill in the art. Advantageously, the use of a virtual robot to accomplish the tasks illustrated above in FIG. 9B may reduce operational costs associated with teaching robot 102 when and where to apply filters to sensor 304 by allowing robot 102 to determine a best filter 324 virtually (e.g., without having to navigate back to point 314).

FIG. 3C is a top view of robot 102 at position 314 along route 302 applying a best filter 324, of plurality of filters 322 illustrated in FIGS. 3B-3C, to sensor 304 and eliminating the detection of false positive 320, according to an exemplary embodiment. Best filter 324 may comprise a digital filter, material filter, or a combination of digital and material filters which removes false positive 320 from detection while filtering as little information from sensor 304 as possible. By way of illustrative non-limiting exemplary embodiment, while best filter 324 is applied to sensor 304 at position 314, fewer sensor vision lines 308 are present indicating a reduction in light received from sensor 304 (e.g., filtered light). That is, at the first position 314 controller 122 retrieves instructions from its memory that associates first position 314 with a potential false positive 320 that was identified when robot 102 is traveling under control of an operator 306 as shown in FIG. 3A and further associates position 314 with best filter 324 used to remove the false positive 320 from detection. This reduction of light received from sensor 304, as illustrated in FIG. 3C, may eliminate false positive 320 from detection as indicated by sensor vision lines 308 no longer reaching false positive 320. Robot 102 may continue along route 302 without detecting collision with false positive 320 after best filter 324 is applied to sensor 304.

Additionally, FIG. 3C illustrates robot 102 at position 318, beyond false positive 320 along route 302 at a later duration and removing best filter 324, according to an exemplary embodiment. Removal of best filter 324 is illustrated in FIG. 3C by a cross, representing sensor 304 on robot 102 is no longer using best filter 324. As illustrated in FIG. 3C, once best filter 324 is removed from sensor 304 at position 318, the number of sensor vision lines 308 increases indicating an increase in the amount of light reaching sensor 304. Increase in the number of sensor vision lines 308 is due to the removal of best filter 324 from sensor 304.

According to at least one non-limiting exemplary embodiment, best filter 324 may comprise a digital filter to be applied to sensor 304, wherein the reduction of sensor vision lines 308 at position 314 may indicate an increase of data being filtered (i.e., removed) by the digital filter. According to at least one non-limiting exemplary embodiment, best filter 324, as well as any filters of filter set or plurality of filters 322, may block light asymmetrically, wherein the axis of symmetry is the forward direction of robot 102 along route 302 as illustrated in FIG. 3C. By way of illustrative non-limiting exemplary embodiment, sensor vision lines 308 above route 302 may be blocked to a different extent than sensor vision lines 308 below route 302 based, at least in-part, on where false positive 320 was detected. Further, different strength of filters 322 may block off different number of vision lines 308 transmitted by sensor 304. For example, a weaker filter 322 may block a smaller number of vision lines 308 such that more vision lines 308 are transmitted to the sensor 304, whereas a stronger filter 322 may block more number of vision lines 308 such that less vision lines 308 (i.e., less light or digital information) are transmitted to the sensor 304.

According to at least one non-limiting exemplary embodiment, as robot 102 moves along route 302 from first position 314 to second position 318, best filter 324 may be dynamically adjusted to remove false positive 320 from detection by sensor 304 based on the movements of robot 102. In other words, as robot 102 travels along path 302, strength or positioning of the best filter 322 may change while robot 102 travels its path 302 based on the varying inputs (i.e., brightness, contrast, reflections off barriers 310 and objects 312, etc.) received by sensor 304 and relative motion of the robot 102 and false positive 320. Dynamic adjustment of best filter 324 may be accomplished by controller 122 moving a material filter using filter actuator unit 510 (further illustrated in FIG. 5) and/or adjust digital filtering parameters (e.g., bandwidths to be filtered, moving the rising/falling edge, moving a cropped portion of images, etc.) based on, at least in part, a movement command of robot 102 as robot 102 navigates from first position or point 314 to second position or point 318. Additionally, according to at least one non-limiting exemplary embodiment, dynamic adjustment of best filter 324 may comprise adjusting the strength of best filter 324 (e.g., adjusting digital filter parameters) and/or exchanging best filter 324 for a different filter, stronger or weaker, of filters 322 to account for the movement of robot 102. Digital filter parameters may include, for example, a rising edge, a falling edge, center (e.g., center of a cropped region), width of a passband, or gain of a digital filter.

According to at least one non-limiting exemplary embodiment, controller 122 may utilize sensor 304 and/or any additional sensors (not shown) to determine dynamic lighting parameters of the environment 300. The dynamic lighting parameters may include, but are not limited to, brightness, contrast, reflections off barriers 310 and objects 312, and/or any additional parameters useful in dynamically adjusting best filter 324 to ensure false positive 320 is removed throughout the movement of robot 102 from first position 314 to second position 318. Advantageously, dynamic adjustment of best filter 324 may allow robot 102 to utilize the weakest filter of plurality of filters 322 to block false positive 320 from detection therefore improving safety for robot 102 by only filtering the minimum amount of data required to block false positive 320 from detection. For example, the weakest filter may be too strong if the environment lighting decreases (e.g., time of day, surroundings of robot 102, etc.), wherein if best filter 324 is not dynamically adjusted, sensor 304 may receive too little light or send too little data for controller 122 to safely navigate robot 102 along route 302.

According to at least one non-limiting exemplary embodiment, first position 314 may be any distance behind false positive 320 (e.g., 0.1, 1, 2, meters, centimeters, inches, etc.) along route 302. Similarly, second position 318 may be any distance beyond false positive 320 along route 302. According to at least one non-limiting exemplary embodiment, a threshold may be set to determine positions 314 and 318, wherein the threshold may comprise a distance to false positive threshold set by a user or manufacturer of robot 102 for both positions 314 and 318. According to the same exemplary embodiment, different distance thresholds may be set for position 314 and 318 (e.g., position 314 is 2 meters in front and position 318 is one meter beyond false positive 320). This threshold may be communicated by a user or manufacturer through a user interface unit 112, or via wired and/or wireless communication using communications units 116.

Figure 4:
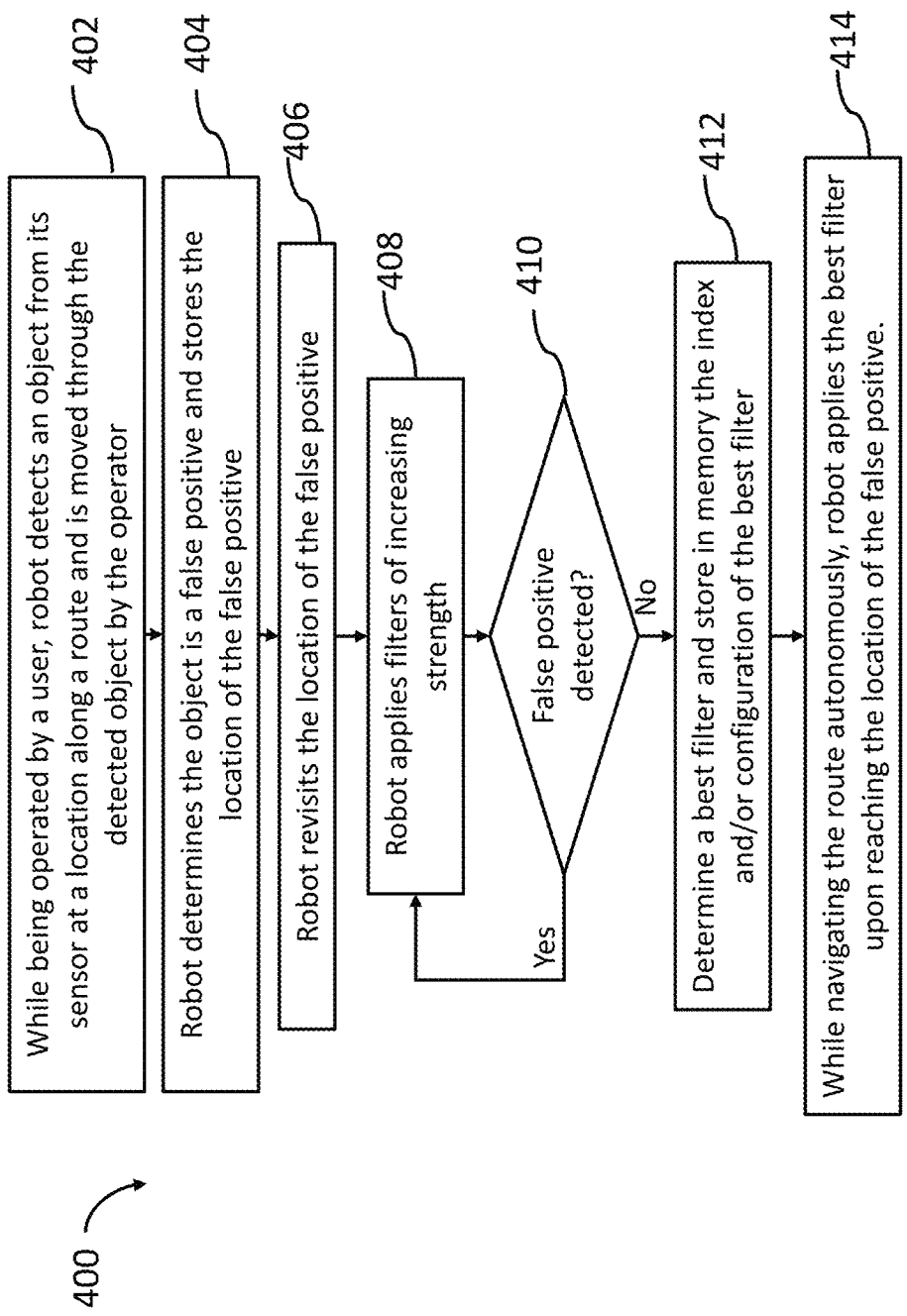
FIG. 4 is a process flow diagram of a method for detecting and filtering false positives along a route by a processor according to an exemplary embodiment.

FIG. 4 is a process flow diagram of an exemplary method 400 of controller 122, of robot 102, detecting the location of and eliminating a false positive along a route using a filter according to an exemplary embodiment. It is appreciated that any steps of method 400 effectuated by the controller 122 or performed by robot 102 comprises of the controller 122 executing computer readable instructions from memory 124 as illustrated in FIG. 1A above.

Block 402 illustrates robot 102 being operated by an operator along a route within a surrounding environment. The operator may manually operate robot 102 (e.g., driven, pushed, followed, etc.) along a desired route as part of a learning process of robot 102 (e.g., as robot 102 learns the route). While being navigated along the route, robot 102 may detect the presence of an object based on sensor data from sensor units 114 at a location along the route, wherein the operator navigates the robot 102 through the detected object without collision with the object.

Block 404 illustrates controller 122 determining the object found in block 402 to be a false positive based on the lack of collision with the object as the operator navigated robot 102 through the object 312. The controller 122 may map the object found in block 402 on a computer readable map and detect, as the operator moves the robot 102, that the robot 102 should have collided with the object based on a footprint of the robot 102 overlapping, at least in part, with the object.

According to at least one exemplary embodiment, the false positive may be determined by robot 102 detecting an object at a first position along the route and not detecting the object at a second position, the second position being slightly further along the route than the first position. Similarly, the robot 102 may move slightly (e.g., turn by 10°) and no longer detect the object or detect an object in a substantially different way (e.g., size, shape, and/or position of the object may change drastically). That is, the robot 102 may not detect the object in a continuous manner as the robot 102 moves, as illustrated in FIG. 2 above. Accordingly, the object may be considered to comprise a false positive due to light reflections.

Figure 7A:
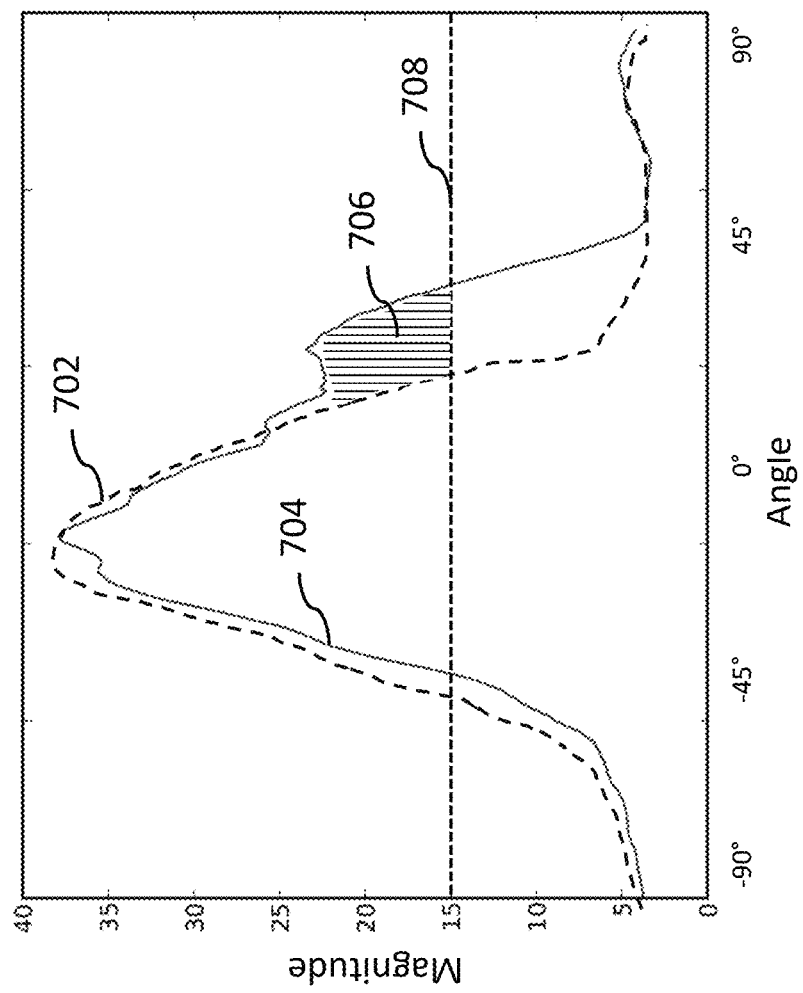
FIG. 7A illustrates detection of a false positive based on a reference measurement, according to an exemplary embodiment.
Figure 7B:
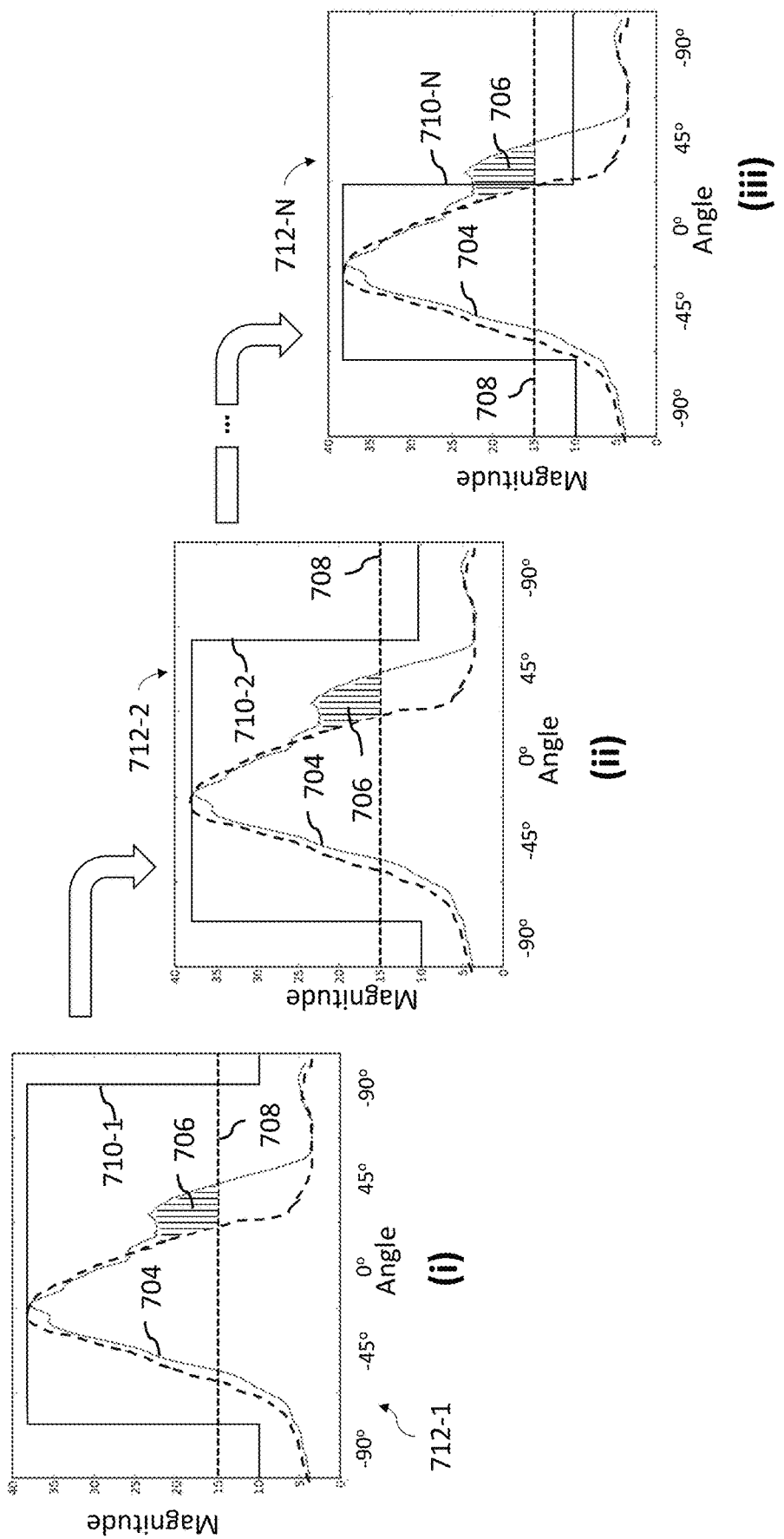
FIG. 7B (i-iii) illustrates an iterative process of incrementing strength of a digital filter to remove a false positive from detection by a sensor, according to an exemplary embodiment.
Figure 7C:
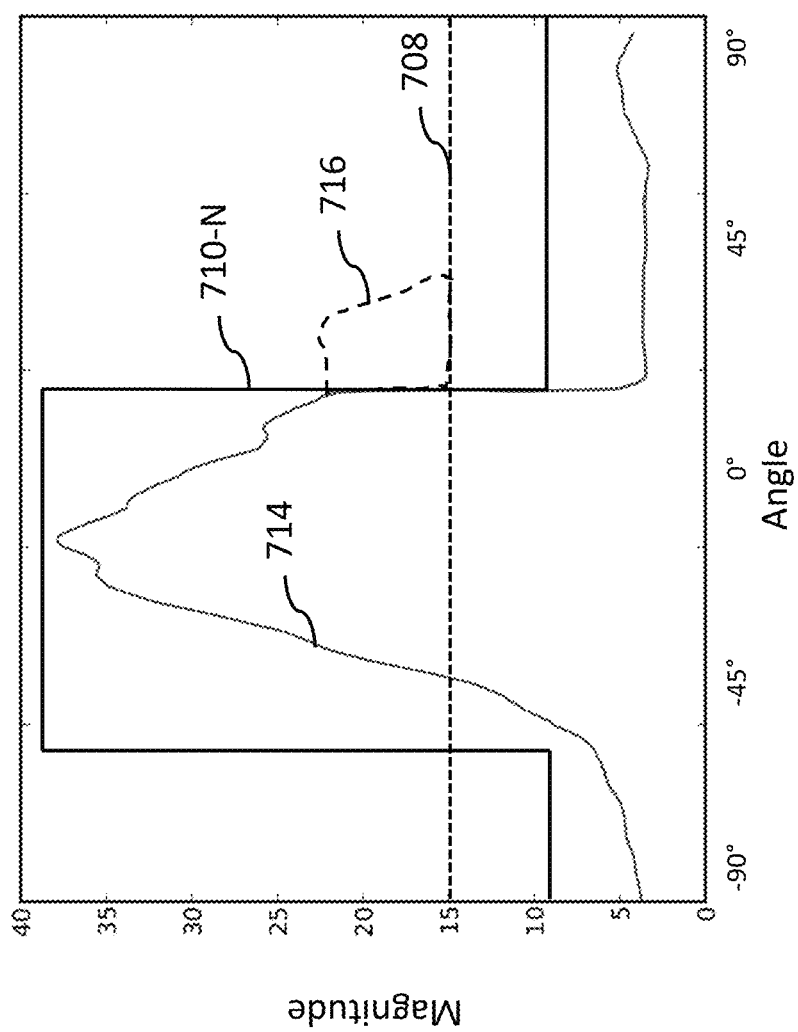
FIG. 7C illustrates removal of a false positive using a digital filter, according to an exemplary embodiment.

According to another non-limiting exemplary embodiment, controller 122 may compare sensor data with a reference map of the environment and determine the detected object to be a false positive based on the reference map not comprising the detected object, as illustrated in FIG. 7A-C below.

According to another non-limiting exemplary embodiment, robot 102 may receive input from a user via user interface units 112, wherein the input comprises confirmation of the detected object being a false positive. Similarly, in some exemplary embodiments, a map of an environment surrounding the robot 102 may be displayed to a user, the map comprising at least objects detected using sensor units 114, wherein the user may indicate (e.g., by clicking, taping, pressing buttons, etc.) objects displayed on the map to indicate to the controller 122 that an object indicated comprises a false positive.

The robot 102 may store the location of the false positive along the route in memory 124 and, in some embodiments, may store additional parameters such as lighting parameters, size and shape parameters of the false positive, and/or any other measurements of sensor units 114 of the false positive useful for determining a best filter 324 as illustrated above in FIG. 3B-C.

Block 406 illustrates controller 122 revisiting the location of the detected false positive along the route. According to at least one non-limiting exemplary embodiment, robot 102 may be navigated autonomously or by the operator to the location of the false positive along the route. According to another non-limiting exemplary embodiment, controller 122 may execute instructions to virtually revisit the location of the detected false positive by recalling parameters of the detected false positive from memory 124, the parameters including, but not limited to, wavelength detected, brightness, position of the object, where in the sensor's field of view the false positive was detected, where along the route the false positive was detected, environmental parameters (e.g., brightness, time of day, etc.), and/or any other parameters measured by sensor units 114.

Block 408 illustrates controller 122 applying filters 322 of increasing strength to the sensor until the false positive is no longer detected.

According to at least one non-limiting exemplary embodiment, controller 122 may cause an actuator, e.g., filter actuator units 510 illustrated in later FIG. 5, to position material filters of increasing strength in front of the sensor until the false positive is no longer detected. The material filters may comprise any material that blocks certain wavelengths of light, reduces light intensity, and/or blocks certain areas of the sensor's vision. Additionally, as illustrated above, increasing the strength of the material filters may correspond to an increase in the amount of light being blocked by the material filters.

According to another non-limiting exemplary embodiment, controller 122 may apply digital filters to the sensor data, wherein the digital filters may comprise a band-pass filter, a low-pass filter, a high-pass filter, transformations to the data (e.g., cropping portions of images), and/or any other form of digital manipulation to the sensor data to remove the false positive from the sensor data. For example, the increasing strength of a digital filter may correspond to decreasing bandwidth of a band-pass filter, transformations of increasing magnitude, increasing the frequency of a rising edge of a high-pass filter in frequency domain, and/or any other operation wherein an increasing amount of sensor data is removed by the filtering operation as the strength of the digital filter increases.

According to another non-limiting exemplary embodiment, robot 102 may use a combination of digital and material filters to remove the false positive from the sensor's field of view, further illustrated in later FIG. 5 (discussed below).

Block 410 illustrates controller 122 determining if the false positive is detected after a material and/or digital filter is applied to the sensor. If controller 122 detects the false positive to be present after a filter is applied, controller 122 returns to block 408 to apply a stronger filter. If controller 122 no longer detects the false positive, controller 122 moves to block 412. The various filters that may be applied to sensor 304 is further illustrated and described below with reference to FIG. 5.

Blocks 408-410 may illustrate an iterative process of determining a best filter 324 to be applied to the sensor to remove the false positive from detection, wherein the controller 122 incrementally increases a strength of the digital and/or material filter configuration until the false positive is removed from detection. The best filter 324 comprising of a digital and/or material filter 322 configuration which removes the false positive from detection while filtering a minimal amount of information from the sensor.

Block 412 illustrates controller 122 determining a best filter 324, the weakest of the set of increasing strength filters 322 that blocks the false positive from detection. Controller 122 may determine the best filter 324, comprising a configuration of material and/or digital filters 322, based on the configuration of filters 322 that first remove the false positive from the sensor data in block 410. Controller 122 may store the index (e.g., 1, 2, 3, etc. illustrated in FIG. 3) of the material filter and/or the transfer function of the digital filter (illustrated in FIG. 7) in memory 124 associating the best filter 324 with the location along the route where the false positive was first detected. That is, controller 122 is configured to store information on the best filter 324 to apply, determined in a systematic and a particular manner illustrated in blocks 408-410, as it associates the best filter 324 information with corresponding location of robot 102 along the traveled path 302, as illustrated in FIG. 8 below. Storing of a location associated with detection of the false positive 320 and best filter 324 associated with removal of the false positives 320 at the location is stored in memory 124 in a specific manner, as illustrated in FIG. 8 below for example, such that the best filter 324 used to remove the false positive from detection may be easily and quickly recalled from memory 124 during future navigation at or near the location (e.g., upon navigating to point 314 at later times as illustrated in FIG. 3C above). It is appreciated that steps illustrated in blocks 406-412 may be repeated for any number of false positives detected along the route (e.g., to generate entries in a table illustrated in FIG. 8).

According to the exemplary embodiment, wherein robot 102 uses a combination of digital and material filters, the steps illustrated within blocks 408, 410, and 412 are further expanded in later FIG. 5-6 to account for both the digital and material filters working synchronously with each other when determining a best filter 324 configuration.

Block 414 illustrates robot 102, navigating the route autonomously, upon reaching the position along the route stored in memory 124 where the false positive was detected, determined in block 402, applying the best filter 324, determined in block 410, to the sensor detecting the false positive in order to remove the false positive from detection.

It is appreciated by one of ordinary skill in the art that the exemplary method 400 may be readily applied to multiple sensors for multiple false positives along a route. In other words, controller 122 may execute specialized algorithms to store in memory 134 or memory 124 that specific filter that was applied at the specific location on its route. That is, the best filter 324 being applied to sensor 304 is associated with the location on the route where false positive is detected by sensor 304 (e.g., location 314 of FIG. 3A).

Figure 5:
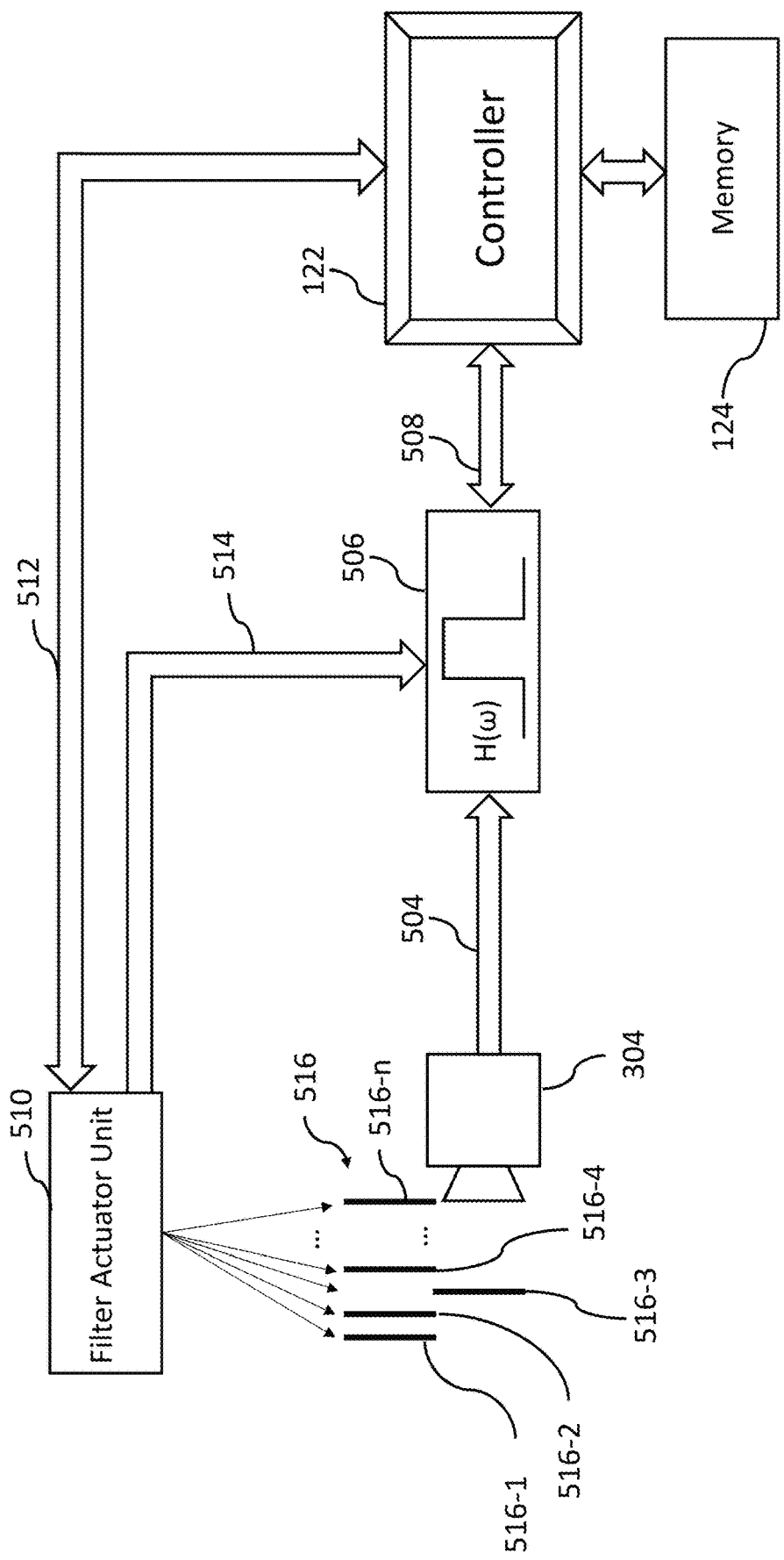
FIG. 5 is an illustration of an apparatus used to remove false positives from detection by a sensor, according to an exemplary embodiment.

FIG. 5 is an exemplary filtering apparatus configured to remove a detected false positive from sensor 304 using a set of increasing strength material filters 516 and a digital filtering operational unit 506, according to an exemplary embodiment. Material filter set 516 may comprise a plurality of material filters of increasing strength 516-1, 516-2, . . . 516-n, wherein index "n" is representative of any positive integer number, to be positioned in front of the light receiving aperture of sensor 304. Material filter 516-3, as illustrated, is positioned in front of sensor 304 by controller 122, executing specialized instructions stored in memory 124, sending control signals to a filter actuator unit 510 to move material filter 516-3 into position. That is, controller 122 executes a specialized algorithm to have a specific filter (i.e., filter 516-3, for example) be positioned in front of sensor 304.

Connection 504 may comprise a wired or wireless data link between sensor 304 and filter operational unit 506. The data transferred across connection 504 may comprise sensor data requiring further processing by filtering operational unit 506 to remove a false positive from the sensor data. The sensor data may be a continuous analog signal or discrete in time digital signal.

Filtering operational unit 506 may be configured, as illustrated, to receive sensor data, filter the sensor data to remove a false positive, and send the filtered data to controller 122 via connection 508 according to an exemplary embodiment. As shown in exemplary FIG. 5, filtering operational unit 506 further comprises a transfer function H(ω), wherein ω may be a frequency measure (e.g., radians per second or Hz) or other parameter of sensor data (e.g., pixel number within an image). H(ω) may be illustrative of any digital transformation or manipulation performed on data from sensor 304 including, but not limited to, cropping, warping, reducing brightness, and/or manipulation of any parameter of the sensor data. H(ω) may comprise one or more low-pass, band-pass, or high-pass digital filters with various parameters (e.g., rising/falling edge frequencies, gain, etc.) to be applied to data from connection 504. Controller 122, executing instructions from memory 124, may manipulate parameters of transfer function H(ω) via connection 508, such that H(ω) is configured to remove a false positive from the image data received by connection 504. The parameter manipulations of H(ω) are based on, at least in part, the parameters of the detected false positive (e.g., relative location, brightness, etc.), which filter of material filters 516 is applied to sensor 304 (communicated via connection 514), and/or dynamic lighting parameters of the environment. Additionally, the parameter manipulations may comprise adjusting parameters of $H(\omega)$ such as gain, bandwidth, center $\omega_o$ position, and/or rising/falling edges of the filter as well as the type of filter used (e.g., high, low, or band pass). The types of filters may include, but are not limited to, Mean filters, Chebyshev filters, Gaussian Filters, Frequency Filters, Noise Reduction filters, elliptical filters, convolutional operations, smoothing operations, and/or any other digital filter or digital manipulation of data from sensor 304.

According to at least one non-limiting exemplary embodiment, filtering operative unit 506 may be further configured to apply frequency spectrum transformations to the sensor data from connection 504. The frequency spectrum transformations may include, but are not limited to, discrete Fourier transform (DFT), discrete time Fourier transform (DTFT), fast Fourier transform (FFT), and/or any other frequency spectrum transformation to a continuous or discrete time signal arriving from connection 504. According to another non-limiting exemplary embodiment, sensor 304 may be configured to output data within the frequency domain using substantially similar methods illustrated above.

According to at least one non-limiting exemplary embodiment, filtering operative units 506 may be a part of controller 122 wherein filtering operations performed by filtering operative units 506, as illustrated in FIG. 4, may instead be done by controller 122, executing instructions stored on memory 124. The apparatus illustrated in FIG. 5 may or may not comprise a separate filtering operative unit and is appreciated by one of ordinary skill in the art that filtering operative unit 506 may be illustrative of filtering instructions executed by controller 122.

Connection links 504, 508, 512, and 514 may comprise a wired and/or wireless communication channel capable of sending data to and from the operative units and controller 122 illustrated in FIG. 4. Additionally, sensor 304 may comprise some or all of the features of sensor units 114 previously illustrated in FIG. 1A.

According to at least one non-limiting exemplary embodiment, controller 122 and memory 124 may be external to a robot 102 such as, for example, on a server. Accordingly, the external controller 122 may be communicatively coupled via wireless communication to filter actuator unit 510 and sensor 304 using a similar architecture illustrated in FIG. 1B.

Filter actuator unit 510 may comprise a plurality of motors and/or servos configured to position individual material filters, of material filters set 516, in front of the light-receiving aperture of sensor 304. Filter actuator unit 510 may additionally be communicatively coupled via connections 512 to controller 122, as illustrated in exemplary FIG. 4, to receive instructions from controller 122 comprising which material filter 516 is to be positioned in front of sensor 304. Filter actuator unit 510 may additionally send feedback signals to the controller 112 and filtering operative unit 506 via connections 512 and 514, respectively, wherein the feedback signals may be configured to communicate which material filter 516 is positioned in front of sensor 304 based on the instructions received from the controller 122. In turn, filter actuator unit 510 maneuvers and places the correct filter from the material filters set 516 in front of sensor 304.

According to at least one non-limiting exemplary embodiment, controller 122 may dynamically adjust material filters 516 applied to sensor 304 based on changes of dynamic lighting parameters of the environment, wherein a different material filter 516 may be applied if changes in the dynamic lighting parameters of the environment are detected (e.g., as robot 102 moves). The material filter applied to sensor 304 comprising the material filter 516 which filters a minimum amount of light information reaching the sensor 304 while removing the false positive from detection (e.g., in accordance with method 600 and 900 of FIGS. 6 and 9 respectively). Controller 122, upon detecting changes in the dynamic lighting parameters, may send signals 512 to filter actuator unit 510 to position a different material filter (516-1, 516-2 . . . 516-n) than previously determined in front of sensor 304 to remove false positives from detection. In some instances, the signals may configure the filter actuator unit 510 to reposition a currently applied filter 516. Controller 122 may, for example, execute method 900 illustrated in FIG. 9 below as the robot 102 moves to determine the material filter 324 to be applied to sensor 304 and repeat method 900 as dynamic lighting parameters change as the robot 102 moves.

According to at least one non-limiting exemplary embodiment, filter actuator unit 510 may dynamically adjust the material filter as the relative positions of a robot and a false positive change with movements of the robot. For example, according to at least one exemplary embodiment, a material filter may comprise a blackout region or a region which blocks light from reaching sensor 304 within the blackout region. Increasing the strength of filters comprising a blackout region may include using filters with increasingly larger blackout regions. As the robot navigates towards the false positive, sensor 304 perceives size of the false positive as increasing, requiring filter actuator unit 510 to position a material blackout filter (526-1, 516-2 . . . 516-n) with a higher index (e.g., stronger filter) in front of sensor 304, therefore increasing the size of the blackout region and removing the false positive from detection. Additionally, according to the same non-limiting exemplary embodiment, the position of the false positive, as perceived by sensor 304, may move as the robot moves along a route causing filter actuator unit 510 to move the blackout region of the material filter used such that the blackout region is dynamically positioned to block light from the false positive. Similar methods may be applied using material filters of different types (e.g., light intensity filters, optical bandpass filters, etc.) and are readily discernible by one of ordinary skill in the art.

Advantageously, having filter actuator unit 510 dynamically adjust the material filters 516 based on the relative position of the false positive detected by sensor 304 may reduce the computational power required by controller 122 by reducing the number of manipulations to the parameters of $H(\omega)$ which, in some cases, may be computationally costly and time consuming. Additionally, the filtering apparatus illustrated in FIG. 5 may further minimize excess data lost during filtering of the false positive allowing for safer more accurate navigation of a robotic apparatus.

The communication process between sensor 304, filter actuator unit 510, controller 122, memory 124, and filtering operative unit 506 are reflected by arrows illustrated in FIG. 5. For example, upon detecting a false positive by sensor 304, a signal corresponding to, for example, visual data (e.g., an image) is transmitted to filtering operative unit 506. Filtering operative unit 506 transmits the received signal to controller 122, which determines which one of the material filters 516 to apply. Based on its running specialized algorithm from memory 124, controller 122 transmits information regarding which material filter 516 to apply to filter actuator unit 510 via link 512. Filter actuator unit 510, upon receiving such instruction from controller 122, engages a plurality of motors and/or servos and/or motor sensors, which places the appropriate material filter (516-1, 516-2 . . . 516-n) in front of sensor 304. Filter actuator unit 516 may communicate feedback signals to controller 122 and filtering operative unit 506 via connections 512 and 514, respectively. Based on this updated configuration, sensor 304 transmits an updated signal to filtering operative unit 506, which then processes the signal to remove false positive 320 by configuring H(ω) accordingly. This process may be repeated until the false positive is removed from detection, wherein the configuration of material filters 516 and digital filter of filtering operative unit 506 which removes the false positive from detection may be considered as the best filter 324, illustrated in FIG. 3B-C above. The above-mentioned steps are also illustrated in further detail with respect to FIG. 6 flowchart.

According to at least one non-limiting exemplary embodiment, a filtering system for removing detection of a false positive by sensor 304 may comprise only a material filtering system or digital filtering system. For example, controller 122 may only utilize transfer function H(ω) to remove a false positive from detection, as illustrated below in FIG. 7A-C. Similarly, controller 122 may only utilize material filters 516 to remove the false positive from detection by sensor 304 by filtering the light received from the false positive.

Figure 6:
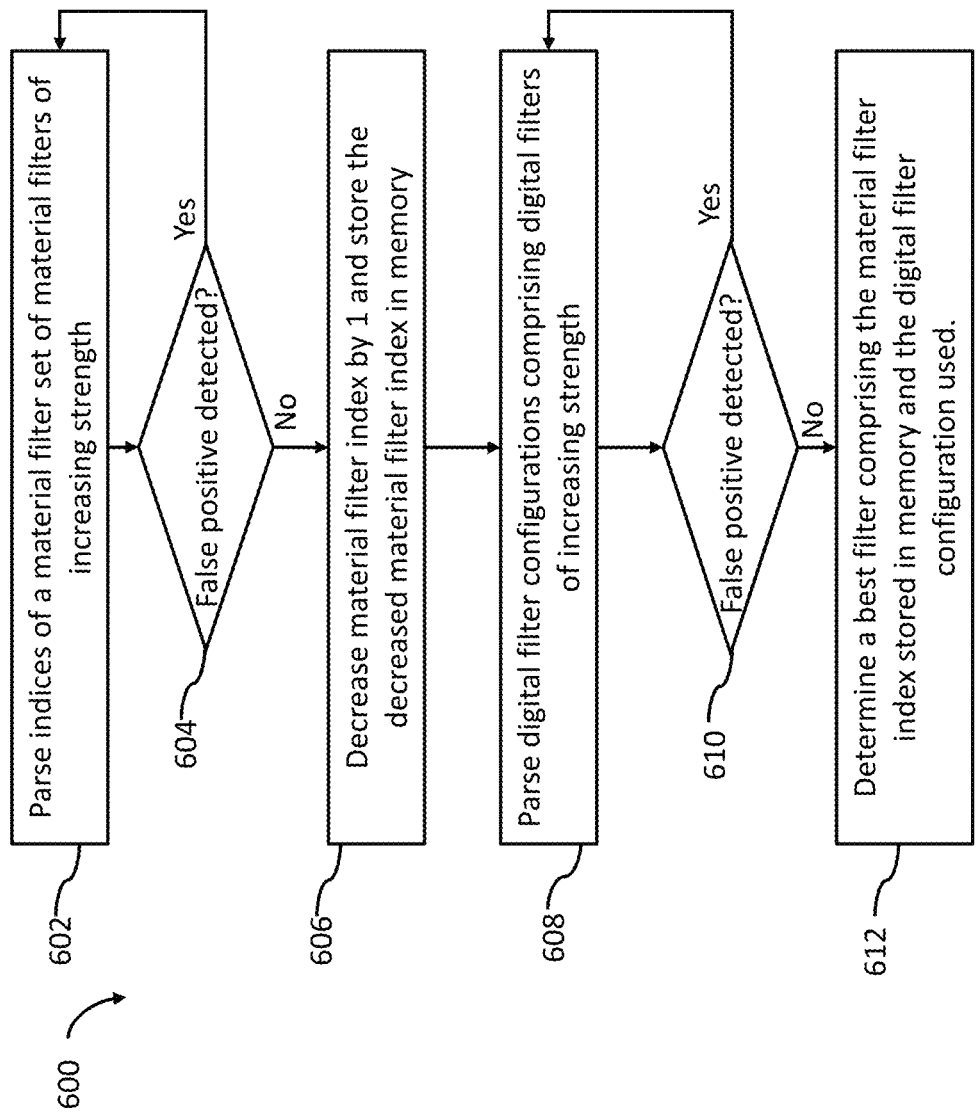
FIG. 6 is a process flow diagram of a method for detecting and filtering false positives along a route using the apparatus illustrated in FIG. 5, according to an exemplary embodiment.

FIG. 6 is a process flow diagram illustrating a method 600 for controller 122 to determine a best filter from a set of material and digital filters using the apparatus illustrated in FIG. 5, according to an exemplary embodiment. The steps illustrated in blocks 408, 410, and 412 in FIG. 4 are expanded in FIG. 6 to illustrate the use of both material and digital filters to remove a false positive from detection by a sensor such that the best filter determined is configured to minimize the data lost by the best filter. The best filter corresponding to a configuration of material filters 516 and digital filters which remove the false positive from detection while minimizing information filtered by the best filter configuration. It is appreciated that method 600 is executed at a location where a false positive is detected (e.g., location 314 of FIG. 3A) and/or is executed using a virtual simulation of the false positive at the location (e.g., by controller 122 recalling any or all measurements from sensor units 114 at the location where the false positive is detected).

Block 602 illustrates controller 122 parsing a set of increasing strength material filters 516, each of the material filters comprising a positive integer index wherein a lower index corresponds to a weaker filter. Controller 122 may utilize a filter actuator unit to position a material filter 516, of the set of material filters, in front of the sensor, as illustrated in FIG. 5, for later determining if a false positive is detected using the material filter 516, illustrated in block 504. The controller 122 may start with a weakest material filter 516-1 and incrementally increase a strength of the material filters applied.

Block 604 illustrates controller 122 determining if a currently applied material filter 516 is strong enough to remove the false positive from detection by the sensor. If the false positive is still detected, controller 122 may move to block 602 and increment the index of the material filter to be applied to the sensor by one. Controller 122 repeats the processes of blocks 602 and 604 until a material filter 516-i, and a corresponding index "i", of minimum strength that may remove the false positive from detection, is determined.

Block 606 illustrates controller 122, having determined a minimum strength material filter index required to remove the false positive, subtracting 1 from the material filter index and storing the decremented index in memory 124. The decremented index stored in memory corresponds to a strongest material filter 516 wherein the false positive is still detected, but only slightly (i.e., applying a next strongest material filter 516-j will remove the false positive from detection, index j being one (1) greater than i).

Block 608 illustrates controller 122 parsing through digital filter configurations comprising digital filters of increasing strength. For example, parsing through a set of bandpass digital filters of increasing strength may comprise decreasing the bandwidth of the digital filter applied to the sensor as controller 122 parses the set. Similarly, increasing the strength of a digital filter configuration, as stated above, includes filtering more data using the digital filter. According to at least one non-limiting exemplary embodiment, the digital filter configurations may not comprise discrete digital filter configurations wherein controller 122 may continuously increase the strength of the applied digital filter by adjusting filter parameters until the false positive is no longer detected, as illustrated in block 610. Digital filters applied to the sensor may comprise any form of digital data manipulation including, without limitation, smoothing filters, cropping portions of images, convolution operations, Gaussian filters, spatial transformations to pixels of images, digital masks (e.g., pixel masks), and/or removing measurements from portions of a field of view of the sensor.

Block 610 includes controller 122 determining if the false positive is detected using the material filter 516-h, index "h" being one (1) less than index "i" illustrated in block 604 above, stored in memory in block 606 and a current digital filter configuration applied to the sensor. If the false positive is still detected, controller 122 may increase the strength of the digital filter configuration further in block 608 until the false positive is no longer detected in block 610.

Block 612 includes controller 122 determining a best filter, the best filter comprising the material filter index "h" stored in memory in block 606 and the digital filter configuration determined in block 610, which removes the false positive from detection by the sensor.

Advantageously, exemplary method 600 may allow for a maximum of data to be received from the sensor by using a minimum strength configuration of digital and material filters to facilitate accurate and safe navigation of a robotic apparatus. By decrementing the minimum strength material filter used to completely remove the false positive, the maximum strength material filter, wherein the false positive is still seen, may be determined thereby minimizing additional digital filtering of potentially useful data (e.g., light data reaching the sensor).

The exemplary method 600 as illustrated is configured to minimize the use of digital filters and therefore minimizing computational costs associated with determining and implementing a best filter. Exemplary method 600 is not intended to be limiting and may comprise more, fewer, different, and/or rearranged steps as illustrated in FIG. 6. For example, controller 122 may determine a weakest digital filter to be applied to the sensor data prior to determining a material filter, wherein the material filter index stored in memory may not be decremented by 1. Advantageously, this rearranged method may be useful in embodiments where high computational costs are not an issue and a robot may have limited material filters available. One of ordinary skill in the art would appreciate that exemplary method 600 is illustrative of any method, using the systems and apparatuses of the present disclosure, for finding a minimum strength best filter, comprising a digital and material filter configuration, to remove a false positive from detection by a sensor. The systems and methods of the present disclosure may also be applied to utilization of either a material filter 516 or a digital filter for use infiltering a false positive from detection by a sensor of a robot 102, as appreciated by one skilled in the art and further illustrated in FIG. 9 below.

FIG. 7A-C are illustrative of an exemplary method for applying a digital filter 710 to sensor data 704, taken at a location, to remove a false positive from detection based on a reference reading 704 using filtering operative unit 506 illustrated above in FIG. 5. Digital filter 710 may be illustrative of a cropping function, convolution, mask applied, and/or any other digital manipulation of data 704. As illustrated in FIG. 7A-C, the vertical axis corresponds to a magnitude reading of arbitrary values wherein, according to the embodiment illustrated, the magnitude reading corresponds to an object detection where values of the sensor data 704 are above threshold 708. According to some non-limiting exemplary embodiments, the magnitude reading may be representative of measurements of parameters associated with object detection such as, but not limited to, brightness, saliency measures, distance measures, etc. Additionally, the horizontal axis corresponds to an angle reading, wherein the angle corresponds to the angle, relative to 0 degrees being the center of the field of view of the sensor, which the sensor reading was taken. It is appreciated that a sensor reading may comprise two angular dimensions, such as a camera capturing two dimensional images, wherein the single angular dimension is illustrated for clarity.

According to another non-limiting exemplary embodiment, the angle reading may be a spectral frequency reading comprising a plurality of frequencies of light detected by the sensor or position reading comprising positions on a 1-dimensional horizontal plane of reference (e.g., left and right positions). Additionally, according to some exemplary embodiments, the range of angle measurements may be smaller or larger than the range illustrated in FIG. 7. Similar systems and methods to the ones described below may be applied to embodiments wherein the horizontal and vertical axes correspond to different measures illustrated in FIGS. 7A-C and should be readily apparent to one of ordinary skill in the art.

FIG. 7A illustrates an exemplary sensor measurement 704 and a reference measurement 702 at a location along a route. The regions of positive object detection correspond to regions where the magnitude of sensor measurement 702 is above threshold 708 as illustrated. Reference measurement 702 may be based on an expected reading by the sensor based on localized objects on a computer readable map and/or prior readings from the sensor at the same location. Based on reference measurement 702, controller 122 may determine region 706 (shaded) to be indicative of a false positive based on the difference between reference reading 702 and sensor reading 704 exceeding a variance threshold, the variance threshold being a different threshold from threshold 708 and comprising a maximum deviation from reference reading 704 wherein digital filtering is required to remove a false positive from detection. This variance threshold allows for small errors in the sensor measurement 704 (e.g., thermal noise, slight movements of the sensor, etc.) to not be determined as a false positive. Additionally, based on reference reading 702, a known object may be present roughly between sensor angles −45 degrees and 22.5 degrees wherein the data corresponding to the known object detection is preserved during the digital filtering process. Reference reading 702 may be generated from a reference map of a surrounding environment, a reference given by a user or external server, or determined from previous readings gathered while navigating the route at the location.

According to another non-limiting exemplary embodiment, controller 122 may determine a false positive 706 based on detecting whether a robot 102 has moved through an object that the robot perceived to be there, as illustrated in FIG. 3A and FIG. 4, and determining the location of the false positive to be at location 706 as illustrated based on a computer readable map and/or a distance measure. According to the same exemplary embodiment, the reference reading 702 may not be present or necessary for determining a false positive as the false positive may be detected using the aforementioned method, or other methods disclosed herein (e.g., as illustrated in FIG. 2).

FIG. 7B(i-iii) illustrates the manipulation of a digital filter 710 by controller 122 increasing the strength of the digital filter 710, comprising a transfer function $H(\omega)$, to remove the false positive 706 from detection by the sensor, according to an exemplary embodiment. As illustrated in FIG. 7A-C, $\omega$ corresponds to an angle measurement in degrees whereas, according to other exemplary embodiments, $\omega$ may represent a frequency measure or any other parameter of a transfer function of a digital filter (e.g., radian measurement). As mentioned above, digital filter 710 may be illustrative of any digital operation performed on the measurement 704 collected by the sensor including, without limitation, a digital mask, a cropped portion of an image, or removal of sensor data within portions of the field of view. Controller 122 communicates with filtering operative unit 506, as illustrated in FIG. 5, to set and adjust the parameters of the transfer function, $H(\omega)$, of digital filter 710 such as, but not limited to, rising edge, falling edge, and gain of the digital filter based on the location of the detected false positive on the sensor data graph as illustrated in FIG. 7B. As illustrated in FIG. 7B(i), controller 122 first applies digital filter 710-1 with minimal strength (i.e., largest bandwidth) during a first iteration 712-1 to determine if the false positive 706 is removed. As illustrated in first iteration 712-1, the false positive 706 is not removed by digital filter 710 (i.e., region 706 is encompassed within a pass-band of filter 710-1) causing controller 122 to increase the strength of digital filter 710, as illustrated in second iteration 712-2 illustrated in FIG. 7B(ii). Controller 122 continues this iterative process until digital filter 710-N, illustrated in FIG. 7B(iii) completely removes false positive 706 using a configuration of minimum strength. Controller 122 may perform "N" iterations, wherein index "N" may represent any positive integer number of iterations. With each filtering process, a tighter band-pass filter 710 is applied to the signal that removes noise (e.g., region 706) and focuses in on the key components of the signal that are of interest. The tighter band-pass filter may correspond to, in some embodiments, the iterative filtering process is applied based on the method and process set forth above in FIG. 4 (blocks 408-410), 6 (blocks 608-610), and/or 9 (blocks 906-908).

Digital filter 710 may be implemented using a plurality of filter types, controlled by controller 122, such as, but not limited to, an elliptical filter, smoothing filter, or convolutional operations, wherein implementation of a brick wall (i.e., rectangular function) filter as illustrated is not intended to be limiting. Digital filter 710 may remove or greatly reduce the amplitude of data outside the filter bandwidth, thereby removing the false positive 706 from detection by filtering the sensor data corresponding to the false positive below the threshold 708. Upon controller 122 determining a best digital filter (e.g., 710-N), comprising a digital filter which removes the least amount of sensor data, controller 122 may store the filter configuration used (e.g., storing the transfer function H(ω) of the digital filter 710-N) in memory. In some exemplary embodiments, the controller 122 may additionally store any additional material filter 516 used to remove the false positive 706 from detection by the sensor in conjunction with digital filter 710-N.

FIG. 7C illustrates an exemplary sensor reading from a sensor of a robot navigating a route at the location where the sensor readings of FIGS. 7A-B were taken. As illustrated in FIG. 7C, false positive 706 is no longer present, as illustrated by dashed lines 716, due to filter 710-N removing the false positive from detection by the sensor. Corrected sensor reading 714, comprising the original sensor reading 702 (illustrated in FIGS. 7A-B) with applied digital filter 710-N, has been adjusted by filtering operative unit 506 using the applied digital filter 710-N to remove the false positive from detection by a sensor.

The method of applying a digital filter 710 to a sensor reading as illustrated in FIGS. 7A-C may be repeated for a plurality of positions along a route wherein controller 122 may apply a plurality of digital filters configurations, comprising the same or different configurations, using filtering operative unit 506 as illustrated in FIG. 5. According to at least one non-limiting exemplary embodiment, the plurality of different digital filter configurations may be stored in an array, wherein controller 122 may access the array at corresponding locations along a route to apply a filter configuration stored in the array, as further illustrated below in FIG. 8. According to another non-limiting exemplary embodiment, controller 122 may make continuous changes to the transfer function, H(ω), of the digital filter configuration at a plurality of continuous points along a route.

FIG. 8 illustrates a data table stored in memory 124 comprising positions along a route and a best filter configuration, comprising a digital filter and material filter, to be applied at the corresponding positions along the route, according to an exemplary embodiment. A controller 122 of a robot 102 may determine a best filter configuration comprising a digital and material filter using the methods illustrated above with respect to FIGS. 3-7. The positions along the route may correspond to positions where a false positive is detected. The memory 124 is configured to store the respective points (i.e., position along route and corresponding filter configuration) according to a specific configuration, format and sequence as discussed in more detail below.

As illustrated, each position along the route may comprise a corresponding digital filter configuration $H_N(\omega)$, wherein index "N" may correspond to a position along the route with the same index (e.g., $H_1(\omega)$ corresponds to position 1, etc.). Additionally, each position along the route may further comprise a corresponding best material filter 516, as illustrated above in FIG. 5. As a robot 102 navigates the route, a controller 122 of the robot 102 may recall and utilize a digital filter with a corresponding index or transfer function to remove a false positive from detection. The controller 122 may further position a material filter 516 in front of a sensor detecting a false positive upon reaching a corresponding position along the route.

According to at least one non-limiting exemplary embodiment, only a digital filter configuration or only a material filter may be stored in memory 124 at some or all of the locations along the route. For example, a controller 122 may only utilize a digital filter $H_3(\omega)$ at position 3 to remove the false positive and may therefore store a NULL or zero (0) value for the material filter to be used at position 3 in memory 124. According to at least one non-limiting exemplary embodiment, some transfer functions $H_N(\omega)$ at some locations along the route may comprise the same or substantially similar transfer functions used at other positions along the route and some may comprise substantially different transfer functions.

According to at least one non-limiting exemplary embodiment, controller 122 may change a transfer function of a digital filter and/or a material filter used at corresponding positions along the route as dynamic properties, such as lighting, for example, of a surrounding environment change over time. It is appreciated by one skilled in the art that the exemplary data table illustrated in FIG. 8 may be a self-referential data table wherein additional rows and/or columns may be added as the controller 122 executes computer readable instructions.

FIG. 9 illustrates a method 900 for a controller 122 of a robot 102 to associate a filter, used to remove a false positive from detection by a sensor unit 114, with a position along a route, according to an exemplary embodiment. It is appreciated that any steps of method 900 performed by the controller 122 comprises the controller 122 executing instructions from memory 124. The robot 102 may only comprise a set of material filters 516 or utilize a digital filter for use in removing the false positive from detection. A method for using both a digital filter and material filters 516 for removal of the false positive is illustrated above in FIG. 6.

Block 902 illustrates the controller 122 detecting a false positive at a first position along a route using a sensor. The sensor may comprise any sensor of sensor units 114 illustrated in FIG. 1A above. The first position may comprise any position along a route where the false positive is first detected (e.g., position 314 of route 302 illustrated in FIG. 3A-C above). The false positive may comprise an object detected by the sensor which does not actually exist (e.g., due to sunlight reflections off of a reflective floor).

According to at least one non-limiting exemplary embodiment, the false positive may be detected by the robot 102 operating under user control and observing the user navigating (e.g., driving, pushing, leading, etc.) the robot 102 through the false positive object. The robot 102 may, upon determining no collision occurred as the user moved the robot 102 through the object, determine the object to comprise a false positive. Accordingly, the robot 102 may determine the first position based on a location along the route where the false positive was detected. This method of determining an object comprises a false positive is further illustrated above in FIG. 3A and blocks 402-404 of FIG. 4.

According to at least one non-limiting exemplary embodiment, the false positive may be determined to be a false positive by the robot 102 based on the false positive not being detected at a later point along the route, the later point being substantially close to the first position of the robot 102 along the route where the false positive was first detected. For example, if the false positive is due to light reflections, the robot 102 may detect an object at the first position, navigate slightly forward along the route (e.g., by 1 foot or other small distance), and no longer detect the object or detecting a substantial change in, for example, shape, size, or other parameters (e.g., brightness) of the object. That is, in some instances, false positives may be determined based on detection of the false positive not being detected in a continuous manner (e.g., the false positive may change shape, size, or disappear/reappear) as the robot 102 moves from the first position to a second location further along the route, as illustrated in FIG. 2 above. Accordingly, the object may be determined to comprise a false positive and the location where the false positive (i.e., the detected object) is detected may be stored in memory 124 as the first position along the route.

According to at least one non-limiting exemplary embodiment, a user of the robot 102 may be prompted by a user interface unit 112. The user interface unit 112 may display a detected object, wherein the user may provide input to the user interface unit 112 confirming or indicating that the object is not actually present. Accordingly, the controller 122 may determine the object is a false positive and store a location where the object was first detected as the first position along the route.

Block 904 illustrates the controller 122 imposing a weakest filter on the sensor. The weakest filter comprising either a digital filter (e.g., 710-1) of largest bandwidth or a material filter of highest clarity (i.e., transparency). Digital filters may comprise of, without limitation, cropping a region of an image, adjusting color values (e.g., RGB values) of an image, applying a digital mask, omitting measurements within portions of a field of view of a sensor, and/or any other digital manipulation of sensor data which detects the false positive. Material filters may comprise any material configured to filter light entering a sensor such as, for example, optical bandpass filters, semi-transparent materials, or materials configured to block light entering from a portion of a field of view of the sensor (e.g., blackout filters). According to at least one non-limiting exemplary embodiment, the robot 102 may navigate to the first position along the route where the false positive was detected prior to imposing the weakest filter. According to at least one non-limiting exemplary embodiment, the robot 102 may utilize measurements from sensor units 114 collected at the location along the route where the false positive was detected to simulate itself at the location prior to imposing the weakest filter.

Block 906 illustrates the controller 122 determining if the false positive is detected within the sensor data using a filter configuration applied in block 904 or 906. Preferably, the weakest filter may be configured to be substantially weak such that the weakest filter may almost never remove the false positive from detection. Accordingly, if the false positive is not removed from sensor detection using a current filter configuration, the controller 122 may move to block 908 to increment the filter strength. That is, blocks 906-908 may illustrates an iterative process wherein the controller 122 increments the strength of the imposed filter on the sensor until the false positive is no longer detected.

According to at least one non-limiting exemplary embodiment where a digital filter is to be utilized by controller 122 to remove the false positive, incrementing the strength of the digital filter may be effectuated by reducing a bandwidth associated with the digital filter. In some instances, the digital filter may comprise cropping of a portion of an image, wherein incrementing the strength of this digital filter may comprise of increasing the size of the cropped portion. The cropped portion being centered about the detected false positive. In some instances, the digital filter may remove measurements from a specified portion of a field of view of the sensor (e.g., for a 2 dimensional LiDAR sensor), wherein increasing the strength corresponds to increasing the angular range of the specified portion removed.

Upon controller 122 no longer detecting the false positive within data acquired by the sensor, the controller 122 may move to block 910.

Block 910 illustrates the controller 122 associating the filter applied to the sensor with the first position along the route, the first position corresponding to a location where the false positive was first detected along the route and the applied filter corresponds to a digital or material filter, which removes the false positive from detection in block 906. For example, controller 122 may store the first location and associated digital or material filter utilized to remove the false positive at the first location as an entry in a table similar to the one illustrated in FIG. 8. Upon later navigation of the route and/or near the first position along the route, the controller 122 may reference the table to recall the digital or material filter configuration utilized to filter the false positive from sensor detection, as illustrated next in step 912.

Advantageously, incrementing the strength of the digital or material filter applied to the sensor to remove the false positive from detection may configure the controller 122 to determine a best filter, the best filter corresponding to the digital or material filter which removes the false positive from detection while minimizing information (e.g., light or digital data) filtered. Use of a filter to remove the false positive which is too strong may correspond to loss of potentially essential data for the controller 122 to navigate the robot 102 safely (e.g., a filter could potentially remove a human from detection if the filter is too strong which may lead to collision with the robot 102 and the human). As such, inventive concepts disclosed herein are directed to applying filter configuration of increasing or incrementing strength for removal of false positives from sensor detection. Lastly, after associating the applied filter with the first position along the route at step 910, the controller 122 may execute computer readable instructions to transmit signals to one or actuator units 108 in order to move, translate or navigate the robot 102 along the route, as shown at step 912.

Block 912 illustrates the controller 122 navigating the robot 102 along the route such as, for example, at a later time (e.g., during operation of robot 102) and/or as a method to test or verify that the filter, determined and stored in memory 124 in blocks 906-910, properly removes the false positive from detection. Controller 122 may activate one or more actuator units 108 to effectuate motion of the robot 102. Upon the robot 102 reaching the first position along the route, the controller 122 may recall the filter utilized to remove the false positive from detection associated with the first position in step 910. For example, the first position along the route may comprise any "position along route" of the table illustrated in FIG. 8 above, wherein controller 122 may reference the table to recall the filter utilized to remove the false positive from detection at the first position. The controller 122 may navigate the robot 102 from the first position along the route to a second position along the route and remove the filter from the sensor, the second position being beyond the false positive and along the route.

Inventive concepts disclosed herein are directed to non-transitory, computer-readable, storage medium comprising computer readable instructions embodied thereon. According to at least one non-limiting exemplary embodiment, the computer readable instructions being executable by a processor to configure the processor to detect, using a sensor on a robot, a false positive at a location along a route; apply filter configurations of increasing strength to the sensor to determine a respective filter configuration to filter out the false positive such that the false positive is no longer being detected by the sensor; and transmit signals to at least one motor sensors coupled to the robot in order to have the robot travel past the false positive. Further, the processor is further configured to execute the computer readable instructions to detect at least one object along the route using the sensor while operated by a user; and determine at least one object to be the false positive based on detected movement through the object by the user without collision. The processor is further configured to execute the computer readable instructions to dynamically adjust parameters of the respective filter configuration based on dynamic lighting parameters of a surrounding environment and movements of the robot. The filter configurations comprise material filter configurations, digital filter configurations, and/or a combination thereof; and the filter configurations comprises the respective filter configuration, wherein the least amount of information removed from the sensor and the false positive is no longer detected.

The robotic system comprising a non-transitory computer readable memory and at least one processor configured to execute computer readable instructions to detect, using a sensor on a robot, a false positive at a location along a route; and apply filter configurations of increasing strength to the sensor to determine a respective filter configuration to filter out the false positive such that the false positive no longer being detected by the sensor.

The method of inventive concepts comprising determining, using a sensor on a robot, a false positive at a location along a route, and applying filter configurations of increasing strength to the sensor to determine a respective filter configuration to filter out the false positive such that the false positive no longer being detected by the sensor. The apparatus of inventive concepts are directed to removing a false positive detected by a sensor, comprising a non-transitory computer readable memory; and at least one processor configured to execute computer readable instructions to, determine a respective filter configuration from a plurality of filter configurations, the respective filter configuration including minimum strength for removing the false positive detected by the sensor.

The inventive concepts are directed to a system for removing false positives from a sensor as a robot travels a route, comprising: a memory having computer readable instructions stored thereon; and at least one processor configured to execute the computer readable instructions to activate a sensor on the robot to transmit a first set of plurality of vision lines, transmit a first signal to the sensor to transmit a second set of plurality of vision lines upon the robot reaching near a false positive on the route, the second set of plurality of vision lines being less than the first set of plurality of vision lines. The processor is further configured to execute the computer readable instructions to transmit a second signal to the sensor to re-transmit the first set of vision lines after location of the robot is beyond the false positive on the route. The processor is further configured to execute the computer readable instructions to determine a respective filter configuration from a plurality of filter configurations, the respective filter configuration configured to remove the false positive on the route of the robot. The processor is further configured to execute the computer readable instructions to associate the filter configuration from the plurality of filter configurations with location of the false positive on the route of the robot. The processor is further configured to execute the computer readable instructions to dynamically update the respective filter configuration to a different filter configuration prior to the robot approaching the false positive if the sensor continues to detect the false positive after application of respective filter configuration.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, +15%, ±10%, ±5%, or ±1%. The term "substantially" is used to indicate that a result (e.g., measurement value) is close to a targeted value, where close can mean, for example, that the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A robotic system, comprising:
   a non-transitory computer readable storage medium comprising a plurality of computer readable instructions stored thereon; and
   one or more processors configured to execute the plurality of computer readable instructions to:
     detect, using a sensor coupled to the robotic system, a false positive at a first location along a route;
     apply filter configurations of increasing strength to the sensor to block the false positive until the false positive is no longer detected by the sensor, wherein the application of the filter configurations is performed using simulated measurements of the false positive, the simulated measurements being based on measured data from one or more sensor units at the first location; and
     transmit signals to one or more motors of the robotic system to configure the robotic system to travel past the false positive along the route after the false positive is no longer detected.

2. The robotic system of claim 1, wherein
   the filter configurations comprise a material filter positioned in front of the sensor, a digital filter applied to data received from the sensor, or a combination thereof.

3. The robotic system of claim 1, wherein the one or more processors are further configured to execute the plurality of computer readable instructions to:
   detect the false positive based on a user input, the user input comprising at least one of the user effectuating movement of the robotic system through the detected false positive without detection of a collision, or the user providing input to a user interface of the robotic system.

4. The robotic system of claim 1, wherein the one or more processors are further configured to execute the plurality of computer readable instructions to:
   detect the false positive based on the false positive being detected at the first location and not being detected in a continuous manner as the robotic system moves to a second location further along the route than the first location.

5. The robotic system of claim 1, wherein the one or more processors are further configured to execute the plurality of computer readable instructions to:
   dynamically adjust parameters of the first filter configuration based on movements of the robotic system, and dynamically adjust lighting parameters observed using, at least in part, the sensor.

6. The robotic system of claim 1, wherein the one or more processors are further configured to execute the plurality of computer readable instructions to:
   associate the first location along the route with the first filter configuration configured to remove the false positive from sensor detection at the first location; and
   apply the first filter configuration to the sensor upon navigation of the robotic system at the first location.

7. A non-transitory computer readable storage medium comprising a plurality of computer readable instructions stored thereon, which when executed by one or more processors, configure the one or more processors to:
   detect, using a sensor coupled to a robot, a false positive at a first location along a route;
   apply filter configurations of increasing strength to the sensor to block the false positive until the false positive is no longer detected by the sensor, wherein the application of the filter configurations is performed using simulated measurements of the false positive, the simulated measurements being based on measured data from one or more sensor units at the first location; and
   transmit signals to one or more motors of the robot to configure the robot to travel past the false positive along the route after the false positive is no longer detected.

8. The non-transitory computer readable storage medium of claim 7, wherein
   the filter configurations comprise a material filter positioned in front of the sensor, a digital filter applied to data received from the sensor, or a combination thereof.

9. The non-transitory computer readable storage medium of claim 7, wherein the one or more processors are further configured to execute the plurality of computer readable instructions to:
   detect the false positive based on user input, the user input comprising at least one of the user effectuating movement of the robot through the detected false positive without detection of a collision, or the user providing input to a user interface of the robot.

10. The non-transitory computer readable storage medium of claim 7, wherein the one or more processors are further configured to execute the plurality of computer readable instructions to:
    detect the false positive based on the false positive being detected at the first location and not being detected in a continuous manner as the robot moves to a second location further along the route than the first location.

11. The non-transitory computer readable storage medium of claim 7, wherein the one or more processors are further configured to execute the plurality of computer readable instructions to:
    dynamically adjust parameters of the first filter configuration based on movements of the robot and dynamic lighting parameters observed using, at least in part, the sensor.

12. The non-transitory computer readable storage medium of claim 7, wherein the one or more processors are further configured to execute the plurality of computer readable instructions to:
    associate the first location along the route with the first filter configuration configured to remove the false positive from sensor detection at the first location; and
    apply the first filter configuration to the sensor upon navigation of the robot at the first location.

13. A method, comprising:
    detecting, using a sensor coupled to a robot, a false positive at a first location along a route;

applying filter configurations of increasing strength to the sensor to block the false positive until the false positive is no longer detected by the sensor, wherein the application of the filter configurations is performed using simulated measurements of the false positive, the simulated measurements being based on measured data from one or more sensor units at the first location; and transmitting signals to one or more motors of the robot to configure the robot to travel past the false positive along the route after the false positive is no longer detected.

14. The method of claim 13, wherein
the filter configurations comprise a material filter positioned in front of the sensor, a digital filter applied to data received from the sensor, or a combination thereof.

15. The method of claim 13, further comprising:
detecting the false positive based on user input, the user input comprising at least one of the user effectuating movement of the robot through the detected false positive without detection of a collision, or the user providing input to a user interface of the robot.

16. The method of claim 13, further comprising:
detecting the false positive based on the false positive being detected at the first location and not being detected in a continuous manner as the robot moves to a second location further along the route than the first location.

17. The method of claim 13, further comprising:
adjusting dynamically parameters of the first filter configuration based on movements of the robot, and
adjusting dynamically lighting parameters observed using, at least in part, the sensor.

18. The method of claim 13, further comprising:
associating the first location along the route with the first filter configuration configured to remove the false positive from sensor detection at the first location; and
applying the first filter configuration to the sensor upon navigation of the robot at the first location.

* * * * *